United States Patent [19]

Townsend et al.

[11] Patent Number: 4,798,175
[45] Date of Patent: Jan. 17, 1989

[54] ELECTRONIC IDENTIFICATION SYSTEM

[75] Inventors: Ted H. Townsend, Kansas City; Clinton L. Moore, Parkville; John T. Machnicki, Kansas City, all of Mo.

[73] Assignee: Alfa-Laval Agri, Inc., Kansas City, Mo.

[21] Appl. No.: 917,034

[22] Filed: Oct. 9, 1986

[51] Int. Cl.$^4$ .................. A01K 5/02; G08B 13/24
[52] U.S. Cl. .................. 119/155; 119/51 R; 340/572; 340/573
[58] Field of Search .................. 119/51 R, 155, 159; 340/572, 573

[56] References Cited

U.S. PATENT DOCUMENTS

| Re. 29,610 | 4/1978 | Minasy et al. | |
|---|---|---|---|
| 2,774,060 | 12/1956 | Thompson . | |
| 3,184,730 | 5/1965 | Irish . | |
| 3,423,674 | 7/1969 | Goldsmith et al. | |
| 3,500,373 | 3/1970 | Minasy . | |
| 3,557,758 | 1/1971 | Lack . | |
| 3,559,201 | 1/1971 | Hilliard . | |
| 3,665,449 | 3/1972 | Elder et al. | |
| 3,707,711 | 12/1972 | Cole et al. | |
| 3,711,848 | 1/1973 | Martens . | |
| 3,740,742 | 6/1973 | Thompson et al. | |
| 3,755,803 | 8/1973 | Cole et al. | |
| 3,818,472 | 5/1974 | Mauk et al. | |
| 3,832,530 | 8/1974 | Reitboeck et al. | 340/572 X |
| 3,838,409 | 7/1974 | Minasy et al. | |
| 4,095,214 | 6/1978 | Minasy . | |
| 4,135,184 | 1/1979 | Pruzick . | |
| 4,274,083 | 6/1981 | Tomoeda | 119/51 R x |
| 4,274,089 | 3/1981 | Giles | 340/572 |
| 4,281,321 | 7/1981 | Narlow et al. | 340/572 |
| 4,309,697 | 2/1982 | Weaver | 340/572 |
| 4,333,072 | 6/1982 | Beigel | 340/572 X |
| 4,471,345 | 9/1984 | Barrett, Jr. | 340/572 |
| 4,475,481 | 4/1984 | Carroll | 119/51 R |
| 4,510,495 | 4/1985 | Sigrimis et al. | |
| 4,598,275 | 7/1986 | Ross et al. | 340/573 |

Primary Examiner—Robert P. Swiatek
Attorney, Agent, or Firm—Davie Hoxie Faithfull & Hapgood

[57] ABSTRACT

An electronic identification system for identifying an animal moving through a portal structure is disclosed. A transponder worn on a rope or chain around the neck of the animal is energized by a multi-directional electromagnetic field generated by a double antenna loop in the portal structure. The transponder, when energized, will transmit identifying data back to the antenna loop after the electromagnetic field has been removed. That information will be processed by a microprocessor so that the animal can be identified. The antenna loop is secured within a flexible free-hanging curtain. The curtain is attached only at the top to the frame of the portal structure; the bottom of the curtain is free-hanging so that the curtain and antenna loop will not be damaged if the animal kicks the curtain. The system also includes two ultra-sonic transducers positioned at the entrance and exit of the portal. These two transducers are used to separately detect the presence of the animal in the portal structure and also to determine the direction of movement of the animal.

10 Claims, 7 Drawing Sheets

ELECTRONIC IDENTIFICATION SYSTEM

FIELD OF THE INVENTION

This invention relates to an improved electronic identification system for identifying a moving object where the object is moving through a portal structure or the like.

BACKGROUND OF THE INVENTION

Accurate electronic identification of objects moving through an area is highly desirable. Electronic identification systems eliminate the need for visual monitoring of the objects by a person. Therefore, a greater volume of moving objects may move through the area of interest and still be detected. Further, because electronic identification systems can be adjusted to respond quickly to moving objects, the speed of movement of the moving objects may be increased without the electronic identification system losing the ability to identify the objects.

In the dairy industry such an electronic system is particularly useful. On a dairy farm a limited number of persons operate a milking parlor and many cows enter the parlor for milking in a short time. It is critical to know which cow is approaching the milking apparatus for milking, as the dairy farmer needs to be able to monitor, and also record, the daily milk output for each cow. Without a fast and accurate electronic identification systm, the milking parlor operator would have to visually identify each cow, thus causing extensive time delays in the milking procedure.

Prior attempts to electronically identify farm animals include U.S. Pat. to Carroll No. 4,475,481, issued Oct. 9, 1984, where a passive transponder device containing a coil is hung on a chain or rope around the animal's neck. For identifying an animal which is feeding, the '481 patent apparatus provides an identifier in the feeder box. The identifier has a coil driven by a power amplifier for transmitting energy to the coil in the transponder. The energized transponder then generates an RF signal containing unique identifying information relating to that animal. This signal containing identifying information is transmitted back to the identifier where it is decoded and sent to a computer, which then directs an auger in the feeder box to dispense the proper amount of feed for that particular animal.

A significant problem with the '481 patent apparatus is that the electromagnetic field generated by the identifier, which is used to energize the transponder, is oriented in only one direction, and therefore, if the animal turns his or her head 90°, the axis of the coil in the transponder becomes perpendicular to the axis of the coil in the identifier, and there is insufficient magnetic coupling between the identifier and the transponder, resulting in a failure to energize the transponder and a consequent inability to identify the animal based on transponder-transmitted information.

The Carroll '481 apparatus also does not provide any separate means for sensing the presence of the animal in the feeder (apart from the transponder signal) or for sensing the direction of movement of the animal. Such information is of value as a check on the accuracy of any detection based on the presence of a transponder signal and allows for greater control and monitoring ability of a procedure involving a large number of moving objects, such as cows moving through a milking parlor.

SUMMARY OF THE INVENTION

The present invention is for an improved electronic identification system for identifying objects, particularly farm animals, moving through a portal structure. A double loop antenna generates a multi-directional electromagnetic field which is used to energize a transponder worn by the animal. When energized by the electromagnetic field, the transponder will transmit identifying data back to the antenna loop. A circuit decodes the identifying data and in conjunction with a microprocessor determines if the data is valid. Because of the configuration of the antenna loop, sufficient energy is radiated to the transponder and the transponder signal is received even if the axis of the transponder is changed due to a head movement of the animal or due to the animal entering the portal structure at an angle.

The antenna loop is secured within a flexible free-hanging curtain. The curtain is attached to a frame of the portal structure only at the top. Therefore, the bottom of the curtain is free-hanging and the curtain and antenna loop will not be damaged by a kick from the animal. Stiffener plates in pocket flaps of the curtain may be used to strengthen the curtain.

Two ultra-sonic detectors, one at the entrance to the portal structure and one at the exit to the portal structure, are used to separately detect the presence of an object in the portal structure. A microprocessor, by monitoring the two detectors or sequence, can also determine the direction of movement of the object through the portal structure.

DETAILED DESCRIPTION OF THE INVENTION

Figure 1:
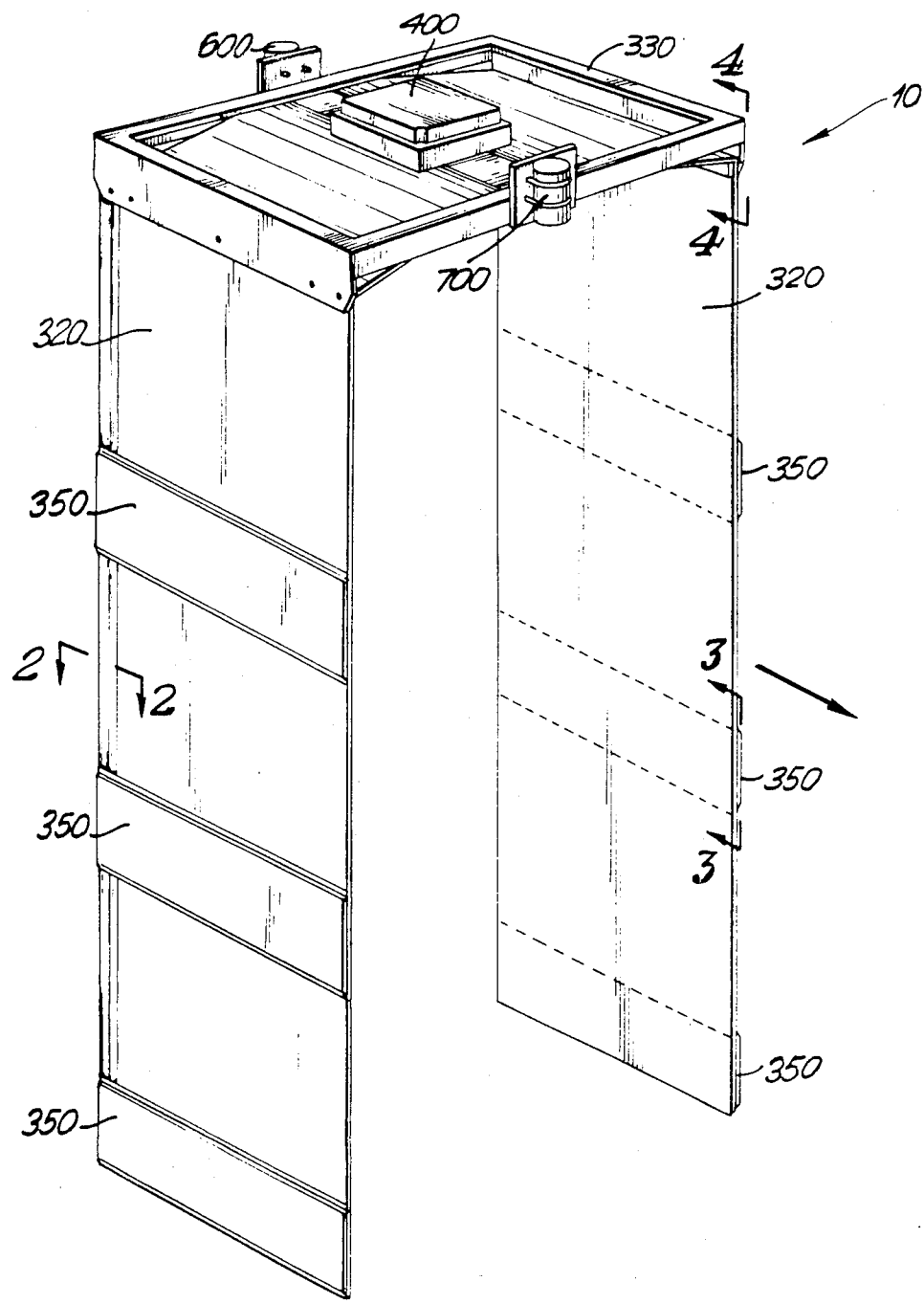
FIG. 1 is a perspective view showing an embodiment of the electronic identification system of the present invention using a portal structure.

The electronic identification system of the present invention is described below, for exemplary purposes only, in terms of an embodiment for animal identification. It is readily apparent that the present invention may be used for any number of different identification tasks, including identification of objects carried or worn by a person, wherein the object to be identified is moving through an area such as a portal structure.

Referring now by reference characters to the figures which illustrate an embodiment of the present invention, an animal such as a cow (not shown), wearing a chain, rope or strap 100 (FIG. 6) containing a transponder 200, moves through a portal structure 10 (FIG. 1) in the direction of the arrow.

As the animal passes through the portal structure 10, the transponder 200 receives energy at one frequency from an electromagnetic field (shown as dotted lines in FIG. 5) generated by an antenna loop 300 contained within a curtain 320 in the portal structure 10. After the circuitry in the transponder 200 is charged to a predetermined value, the electromagnetic field is removed, and the transponder 200 transmits identifying information concerning the animal, at a second frequency, back to the antenna loop 300. This information is processed by an antenna electronic circuit (AEC) 400 (FIGS. 6, 7) and an antenna interface unit (AIU) 500 (FIG. 6). In an application of the present invention to a milking parlor, the AEC 400 and the AIU 500 are used to verify that the identifying information is valid and further assign the milk output to a particular cow.

Another feature of the identification system of the present invention is the detection of the presence and the direction of movement of the animal moving through the portal structure 10 using an ultra-sonic entrance detector 600 and an ultra-sonic exit detector 700, which are both monitored by the AIU 500 as described in further detail below.

FIG. 6 shows in block diagram form the components of the identification system of the FIG. 1 embodiment, including the transponder 200, the antenna loop 300, the AEC 400, the AIU 500, the entrance detector 600 and the exit detector 700.

The electromagnetic field (shown as dotted lines in FIG. 5) develops a voltage in a parallel resonant circuit (not shown) of the transponder 200. This resonant circuit, in the present embodiment, is tuned to the frequency of the transmitted voltage from the antenna loop 300, e.g. a frequency of 131,072 Hz. Thus, the transponder 200 is charged in a conventional manner. As long as the electromagnetic field from the antenna loop 300 is present, the transponder cannot act as a transmitter. However, when the electromagnetic field is removed, the parallel resonant circuit of the transponder radiates a different frequency, e.g. a 98,304 Hz signal, to the antenna loop 300, which acts as a receiver when the electromagnetic field is removed.

The radiated signal from the transponder 200 is a signal consisting of three parts. The first part is a preamble used to show the start of a transmitted message from the transponder 200. The second part is a fixed delay period so that the AEC 400 and the AIU 500 have sufficient time to decode the preamble and determine whether a valid transponder signal (i.e., a signal corresponding to a known transponder) is being transmitted. Parts 1 and 2 of the transponder output signal are the same for all transponders.

The third part of the transponder signal is the unique identifying data for the particular animal. This identifying information in the present information consists of 14 data bits and a parity bit. This third part of the signal is unique for each transponder and is set by changing the program pins on an encoding chip (not shown) in the transponder 200. Such encoding chips and the remaining circuitry in the transponder 200 are well-known in the art. The data from the transponder 200 is transmitted to the antenna loop 300 in the following order: preamble, delay period and identifying information.

After the transponder 200 has transmitted all three parts of the output signal, the transponder will cease to transmit any signals. Further energization of the transponder 200 by the antenna loop 300 will result in a repeat transmission by the transponder 200 of the three-part transponder signal.

Thus, as described above, the electromagnetic field generated by the antenna loop 300 energizes the transponder 200 with a signal at one frequency (e.g., 131,072 Hz) when the animal enters the portal structure 10. When the electromagnetic field is removed, the energized transponder 200 transmits identifying information to the antenna loop 300 at a second frequency (e.g. 98,304 Hz).

In the identification system shown in U.S. Pat. No. 4,475,481, a problem develops if the animal (while wearing a transponder around the neck) turns his or her head when the head is in the feeder box. Because the electromagnetic field in the '481 patent generated by a coil in the identifier in the feeder box is oriented only in one direction, a turn in the animal's head causes the axis of the coil of the transponder to be nearly perpendicular to the axis of the coil in the identifier, resulting in insufficient electromagnetic coupling between the coil in the identifier and the pick-up coil in the transponder. Therefore, to achieve electromagnetic coupling sufficient to energize the transponder, the '481 patent apparatus requires a specified positioning of the transponder in relation to the identifier.

Figure 5:
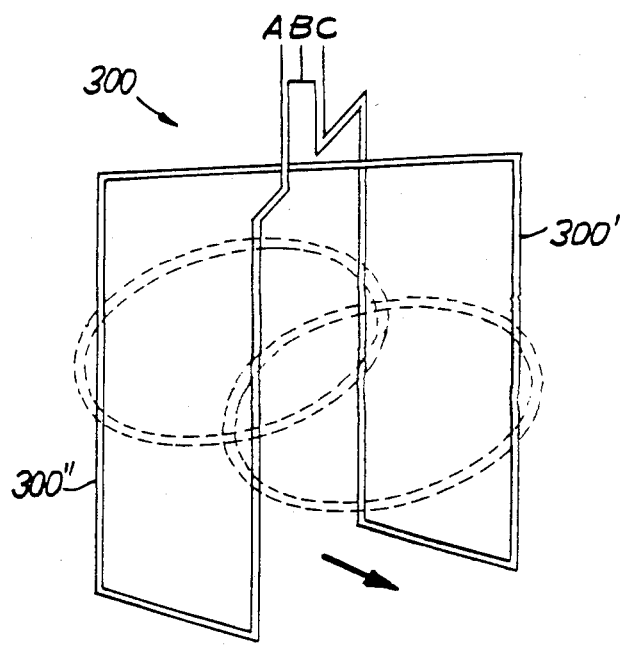
FIG. 5 is a perspective view of the antenna loop within the antenna curtain of the portal structure of FIG. 1 showing as dotted lines the electromagnetic field generated by the antenna loop.
Figure 6:
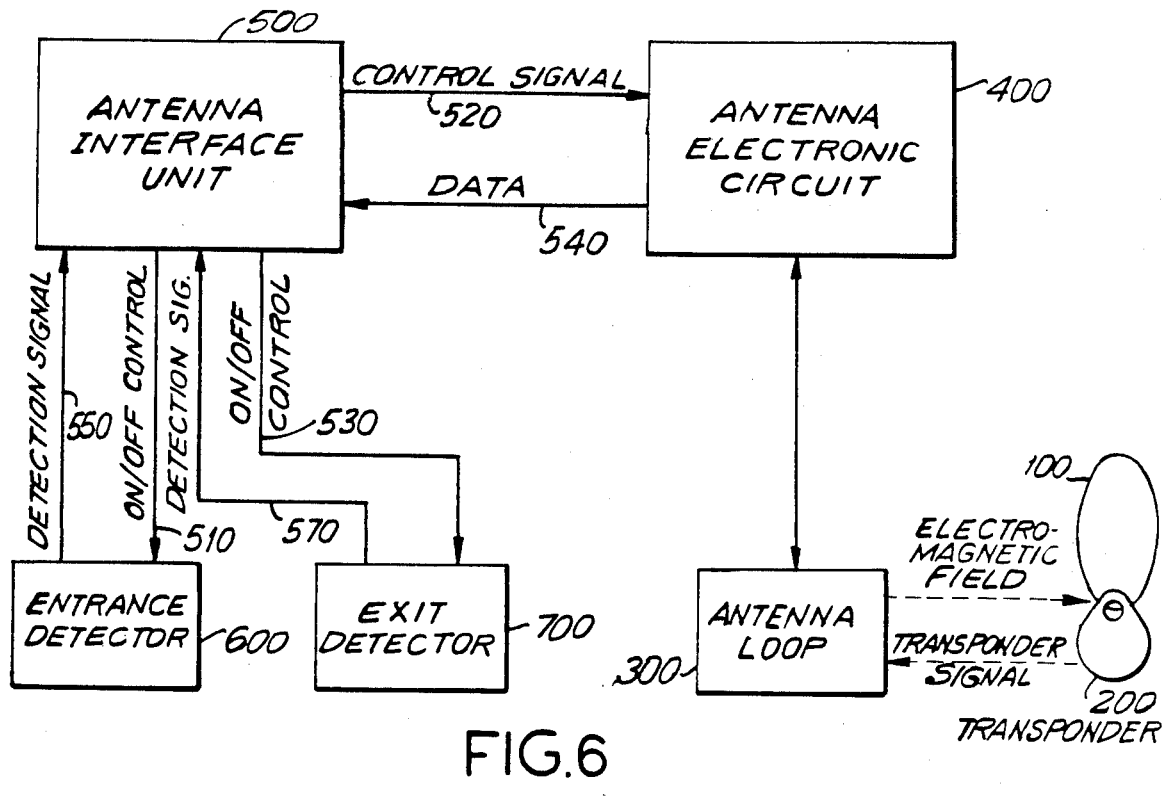
FIG. 6 is a block diagram of the identification system of the present invention.

The present invention eliminates this problem because even if the animal turns his or her head when entering the portal structure 10, or enters the portal structure 10 at an angle, the multi-directional configuration of the electromagnetic field, as shown by the dotted lines in FIG. 5, permits maximum transfer of energy between the antenna loop 300 and the transponder 200 regardless of the angular orientation between the antenna loop 300 and the transponder 200. Because antenna loop 300 generates electromagnetic fields in four angular relations to the direction of animal travel through the portal structure 10 ($-90°$, $-45°$, $45°$ and $90°$), the transponder 200 will pick up enough energy to be energized even if the animal turns his or her head or enters the portal structure 10 at an angle. Similarly, when the antenna loop 300 receives identifying information from the transponder 200, the multi-directional configuration of the antenna loop 300 insures that the antenna loop 300 receives enough of the transponder signal for identification purposes even if the animal turns his or her head.

Also, as seen in FIG. 5, the antenna loop 300, configured in a double loop arrangement, is present on both sides of the portal structure 10. Therefore, the transponder 200 will be subjected to electromagnetic radiation from a left-hand loop portion 300' of the antenna loop 300 and from a right-hand loop portion 300" of the antenna loop 300 as the animal moves through the portal structure 10 in the direction of the arrow in FIG. 5. This results in the transponder 200 receiving sufficient energy even if the animal does not enter exactly through the middle of the portal structure 10.

The present invention, unlike the '481 patent apparatus, does not require the transponder 200 to be positioned in a certain fashion relative to the portal structure 10 to insure identification. Further, unlike the '481 patent apparatus, the present invention does not require the animal to be a specified distance from the antenna loop 300, so long as the animal passes through the portal structure 10.

Figure 7:
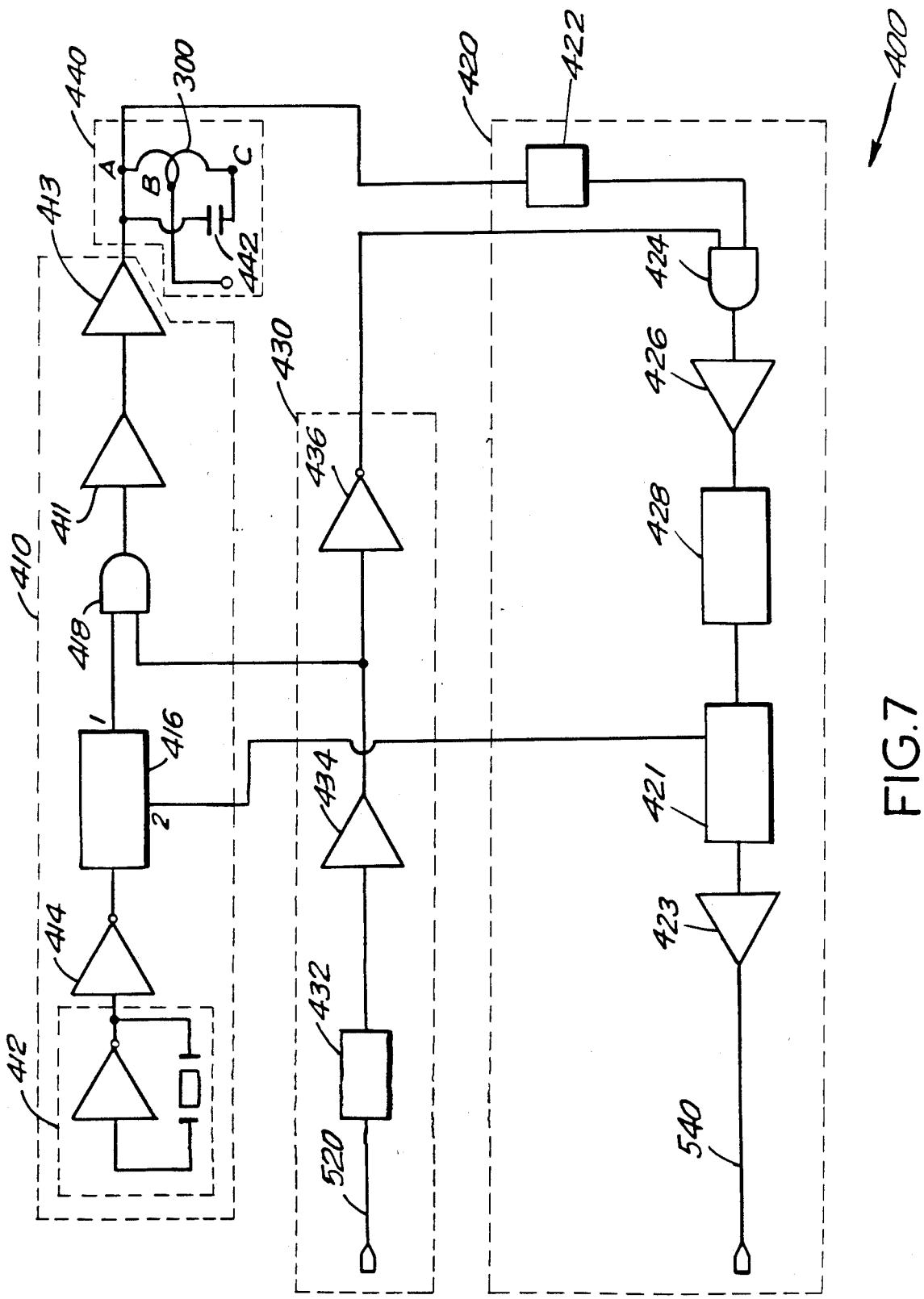
FIG. 7 is a block diagram of the antenna electronic circuit of FIG. 6.

FIG. 7 shows the block diagram form the antenna electronic circuit 400 (AEC). The AEC 400 has a transmission circuit section 410, a receiver circuit section 420, a control circuit section 430 and a parallel resonant circuit section 440.

Transmission circuit 410 powers the parallel resonant circuit 440 so that the parallel resonant circuit 440 generates an electromagnetic field and radiates energy to energize the transponder 200. When switched from the transmission mode to the receiving mode, the parallel resonant circuit 440 receives identifying information from the transponder 200, and the receiving circuit 420 decodes that information and outputs it to the AIU 500 along data bus 540. Control circuit 440, under the direction of a control signal from the AIU 500 along control bus 520, alternatively enables the transmission circuit 410 and the receiver circuit 420, depending on whether the AEC 400 should be transmitting energy to energize the transponder 200 or receiving identifying information from the transponder 200.

The transmission circuit 410 of the AEC 400 in the present embodiment operates as follows. The signal from a 4.194304 Mhz oscillator 412 is fed to a buffer 414. The buffered signal is divided down by frequency divider 416, with output 1 of the divider 416 at 131,072 Hz and output 2 at 32,768 Hz. Output 2 of divider 416 is used in the receiver circuit 420 of the AEC 400, as described in more detail below.

The 131,072 Hz signal from output 1 of divider 416 is gated on and off in gate 418 by the control signal from driver 434. The output from gate 418 is applied to a pulse shaper and driver 411, whose output is applied to a power amplifier 413. The output pulses from amplifier 413 drive the resonant circuit 440 (consisting of the antenna loop 300 and capacitor 442) and cause the resonant circuit 440 to oscillate at a frequency of, e.g. 131,072 Hz.

The resonant circuit of the transponder 200 is tuned to this same frequency of 131,072 Hz. The electromagnetic field created by driving the resonant circuit 440 energizes the transponder 200 when the animal enters the portal structure 10 in the manner previously described.

Figure 5A:
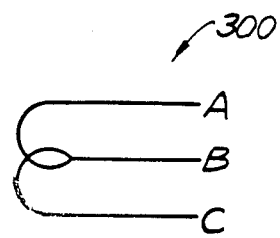
FIG. 5A is a schematic representation of the antenna loop of FIG. 5.

As seen in FIGS. 5, 5A and 7, the antenna loop 300 is center-tapped in order to double the voltage in the resonant circuit 440, with point A of the antenna loop 300 connected to the output of amplifier 413 and capacitor 442, point C connected to capacitor 442 and point B, the center-tap, connected to the supply voltage.

Figure 8:
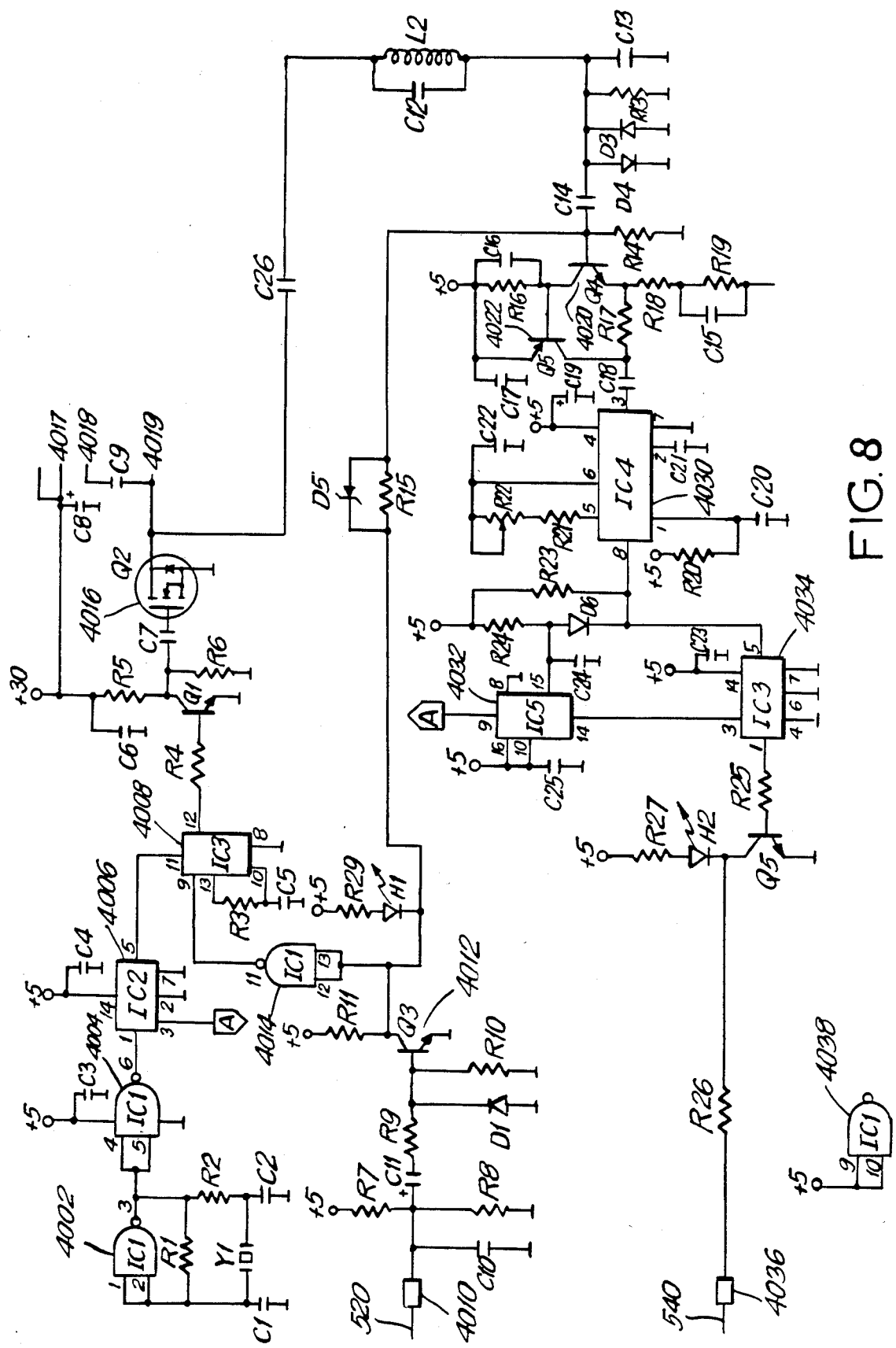
FIG. 8 is an electrical schematic drawing of a portion of the antenna electronic circuit of FIG. 7.

When the control circuit 430, under the direction of a control signal from the AIU 500 along control bus 520, turns off the transmission circuit 410, the receiver circuit 420 is turned on. The receiver circuit 420 operates in the following manner. The transmitted identification signal from the transponder 200 is received by the resonant circuit 440. That transponder signal passes through limiter 422 which excludes frequencies not of interest. The output signal from limiter 422 is gated on and off in gate 424 by a control signal from driver 436. The output from gate 424 is then amplified by amplifier 426 and decoded by the decoder 428 which has an internal frequency equal to the transmission frequency of the transponder signal, e.g. 98,304 Hz. The tone decoder 428 converts the RF data burst signal to a digital level signal. If the input signal to the tone decoder 428 is not 98,304 Hz, indicating that the received signal is not a valid transponder signal, then no output signal is applied to a Manchester encoder 421. However, if the frequencies are the same, then the tone decoded signal is coupled to the Manchester encoder 421. As seen in FIG. 8, output 2 from frequency divider 416 inputs into the Manchester encoder 421. The encoder 421 is used to create a data transmission signal (consisting of a preamble, time delay period and identifying information from the transponder) that can be transmitted to the AIU 500 through a driver 423 along data bus 540. The AIU 500 can detect an error in this signal.

Control circuit 430 operates to control the transmission circuit 410 and the receiving circuit 420 in the following manner. When the AIU 500 wishes to instruct the AEC 400 to transmit energy to the transponder 200, an appropriate signal on control bus 520 passes through protection circuit 432 and driver 434 to gate 412, ultimately resulting in the driving of the resonant circuit 440 in the manner previously described. While the transmission circuit 410 is on, the receiver circuit 420 is off because driver 436 inverts the signal from driver 434, and gate 424 will not pass the transponder-transmitted signal to the tone decoder 428.

An appropriate change in the signal on control bus 520 from AIU 500 disables the transmission circuit 410 and enables the receiver circuit 420.

FIG. 8, which shows the components for a specific embodiment of FIG. 7, has an oscillator 4002 and associated circuitry, followed by a buffer 4004 and a frequency divider 4006. Output 5 of divider 4006 emits a signal with a frequency of 131,072 Hz to one-shot pulse generator 4008. Output 3 of divider 4006, a 32,768 Hz signal, is used in the receiving portion of the AEC 400, as described below.

Generator 4008 will output an inverted output pulse provided that the control signal applied by the AIU 500 along control bus 520 to terminal 4010 is "high," resulting in the turning on of transistor 4012 and the inverting of the output from the collector of transistor 4012 by inverter 4014. This "high" control signal at terminal 4010 turns on the transmission circuit 410 of the AEC 400.

The output pulse from the generator 4008 is applied to the gate of MOSFET 4016. As the MOSFET 4016 is pulsed on and off, the resonant circuit consisting of capacitor C9 and the center-tapped antenna loop (connected to terminals 4017, 4018 and 4019) oscillates at a frequency of 131,072 Hz.

As long as the transistor 4012 is on in response to an applied "high" control signal at terminal 4010, the bias at transistor 4020 is removed and the receiver circuit of the AEC 400 is turned off.

The maximum time transistor 4012 can be turned on is limited by the time constant of capacitor C11 and resistors R7 and R8. This time constant is for a longer duration than the control signal at terminal 4010 to insure that the control signal will control the operation of the transistor 4012.

When the "high" control signal is removed from terminal 4010, the transmission circuit of the AEC 400 turns off and the receiving circuit is turned on. The receiving circuit is turned on by virtue of the fact that when transistor 4012 is turned off, the bias voltage is reapplied to transistor 4020.

When in the receiving mode, the antenna loop connected at terminals 4017, 4018 and 4019 receives the transmitted transponder signal. That transponder signal is coupled through capacitor C26 to the resonant circuit consisting of inductor L2 and capacitor C12, which blocks any energy from the transmitter of the AEC 400 (when it is on) from reaching the receiver portion of the AEC 400.

The received signal then passes through some limiting components and is applied to the amplifier circuit consisting of transistors 4020 and 4022 and related circuitry. The amplified signal is applied to the tone decoder 4030, which operates in the manner described above for the decoder 428 of FIG. 7. Resistor R22 adjusts the internal frequency of decoder 4030 to a frequency of 98,304 Hz.

The Manchester encoder 421 of FIG. 7 is shown as integrated circuits 4032 and 4034 with related circuitry. Integrated circuit 4032 also receives as an input the 32,768 Hz signal from output 3 of divider 4006. The output data from this Manchester encoder scheme is outputted to the AIU 500 on data bus 540 at terminal 4036.

Oscillator 4002, buffer 4004, inverter 4014 and circuit 4038, in the present embodiment, are all part of one integrated circuit. Similarly, one-shot pulse generator 4008 and circuit 4034 are also part of a single integrated circuit.

Chart I below provides an identification of the components in FIG. 8.

CHART I

| Symbol | Value | Description |
| --- | --- | --- |
| R1 | 47K | Resistor |
| R3,R7,R4 | 1K | Resistor |
| R11,R17 | 1K | Resistor |
| R2,R8,R23,R25 | 10K | Resistor |
| R19,R26 | 330 | Resistor |
| R29 | 330 | Resistor |
| R5 | 2.2K | Resistor |
| R9 | 1K | Resistor |
| R10,R15 | 100K | Resistor |
| R13 | 3.3K | Resistor |
| R14 | 56K | Resistor |
| R16 | 680 | Resistor |
| R18 | 10 | Resistor |
| R20 | 39K | Resistor |
| R21 | 3.9K | Resistor |
| R24 | 470K | Resistor |
| R27 | 470 | Resistor |
| R22 | 1K | Variable resistor |
| C1 | 10 pf | Capacitor |
| C2 | 22 pf | Capacitor |
| C3,C4,C10 | .1 mfd | Capacitor |
| C23,C25 | .1 mfd | Capacitor |
| C8,C19 | 4.7 mfd | Tantalum capacitor |
| C9 | .033 mfd | Capacitor |
| C11 | 22 mfd | Capacitor |
| C12 | .0022 mfd | Capacitor |
| C13,C20 | .0022 mfd | Capacitor |
| C22,C5 | .0022 mfd | Capacitor |
| C14,C16 | .01 mfd | Capacitor |
| C17,C21 | .01 mfd | Capacitor |
| C15,C26 | .22 mfd | Capacitor |
| C18 | .001 mfd | Capacitor |
| C24 | .047 mfd | Capacitor |
| C31 | .0022 mfd | Capacitor |
| Q1,Q3,Q4,Q6 | 2N2222A | Transistor |
| Q5 | 2N2906A | Transistor |
| Q2 | IRF730 | MOSFET transistor |
| CR2 | 4.7 volt | Zener diode |
| D1,D3,D4,D6 | IN4444 | Silicon diode |
| D5 | HBR130P | Schottky diode |
| IC1 | 74HC00N | Integrated circuit |
| IC2 | 74HC4024N | Integrated circuit |
| IC3 | MC14013 | Integrated circuit |
| IC4 | LM567CN | Integrated circuit |
| IC5 | MC14520 | Integrated circuit |
| L2 | 680 μH | Inductor |
| H1 | | Green L.E.D. |
| H2 | | Yellow L.E.D. |
| Y1 | 4.194304 MHZ | Crystal |

FIGS. 1–4 show in detail the portal structure 10, and reference should be made to those figures in conjunction with the following description.

When used to monitor dairy cattle, the width of the portal structure 10 should be approximately 28″, the height approximately 69″ and the depth approximately 17″. These dimensions permit cows of various sizes to easily walk through the portal structure 10. The size of the portal structure 10 may be adjusted to accommodate animals or persons as required, and also may be configured to conform to the size requirements of the area surrounding the portal structure 10.

Figure 2:
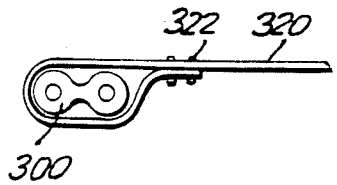
FIG. 2 is a top view of a portion of the antenna curtain of the portal structure along lines 2—2 of FIG. 1.

The antenna loop 300, having a left-hand portion 300′ and a right-hand portion 300″ (FIG. 5) is contained within an antenna curtain 320. The presence of the curtain 320 insures that the object moving through the portal structure 10 does not physically contact and possibly damage the antenna loop 300. As seen in FIG. 2, the antenna loop 300 is held within a fold of the curtain 320 by double-stitch sewing 322. Any other suitable securing means for securing the antenna loop 300 within the curtain 320 may be used.

In the present embodiment, the curtain 320 is made of any suitable flexible material, such as a nylon reenforced vinyl.

Figure 4:
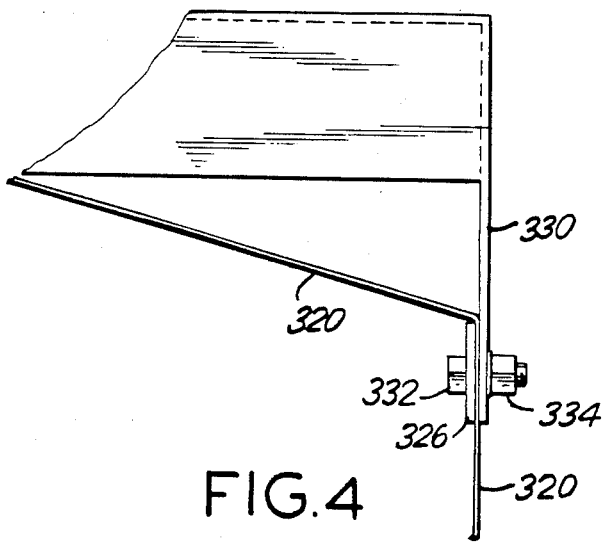
FIG. 4 is a front elevational view of a portion of the frame of the portal structure along lines 4—4 of FIG. 1.

The curtain 320 is secured to a rigid frame 330 of the portal structure 10 by a bolt 332, attachment bar 326 and lockwasher 334, as seen in FIG. 4. The frame 330 may be secured to the ceiling of the building in which the portal structure is housed to insure that the portal structure 10 remains stationary. The curtain 320 hangs on each side of the portal structure 10, secured on each side at the top to the frame 330 in the manner shown in FIG. 4.

Each side of the curtain 320 is free-hanging at the bottom, i.e., each side of the curtain is not attached to any frame structure at the bottom. This free-hanging feature is particularly useful when animals pass through the portal structure 10 because the free-hanging curtain prevents the animal from damaging the antenna loop 300 or the portal structure 10 with a kick or other movement. If the animal does kick the curtain 320, the curtain 320 will swing away, pivoted only at the top where it is attached to the frame 330. It has been found that a free-hanging portal structure such as that shown in FIGS. 1–4 is less costly, requires less maintenance and has a longer service life than a rigid portal structure.

Figure 3:
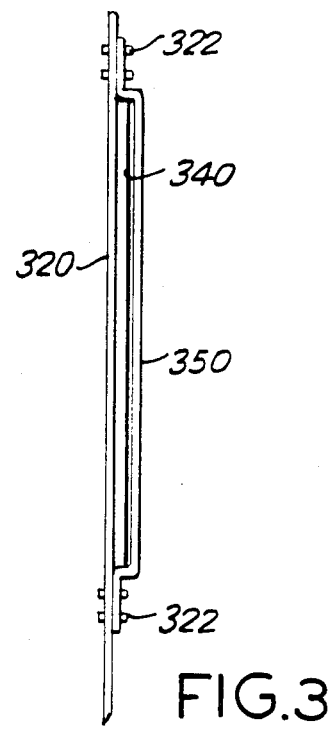
FIG. 3 is a front elevational view of a portion of the antenna curtain of the portal structure along lines 3—3 of FIG. 1.

Stiffener plates 340 (one of which is shown in FIG. 3) are positioned in each of pocket flaps 350 of the curtain 320. The stiffener plates 340 help strengthen the curtain 320 and also result in a more stable hanging of the curtain 320. The stiffener plates 340, which in the present embodiment are made of polypropylene, do not interfere unduly with the flexible aspect of the curtain 320.

In the present embodiment, the AEC 400 is secured to the top of the frame 330 of the portal structure 10 as shown in FIG. 1. The AIU 500, since it is connected to the AEC 400 only by buses 520 and 540, may be located any convenient distance from the portal structure 10.

An additional feature of the identification system of the present invention is the apparatus for sensing the presence and the direction of movement of an object moving through the portal structure 10. In the FIG. 1 embodiment, the sensing apparatus includes an entrance detector 600 and an exit detector 700. Detectors 600 and 700 are both controlled by the AIU 500.

The entrance detector 600 and the exit detector 700 are identical in operation, and therefore only the detector 600 will be described. The detector 600 includes an ultra-sonic transducer (not shown) which transmits and receives ultra-sonic signals. When instructed by the AIU 500 along control bus 510, the entrance detector 600 will turn on and emit a short-burst, cone-shaped pattern of ultra-sonic sound waves. If an object is present within the cone, the sound wave will echo back and be received by the transducer. The received reflected ultra-sonic waves are the converted to an electrical detection signal by the detector 600 and transmitted to the AIU 500 along by 550.

Because the AIU 500 only monitors the detector 600 along bus 550 for a short period of time after the transducer emits the ultra-sonic waves, sound waves which echo back to the transducer from the floor will not echo back to the transducer in time to be noted by the AIU 500. Thus, the entrance detector 600 will only signal the presence of an object if in fact the object is within the cone emitted by the transducer of the detector 600. The exit detector 700 operates in the same fashion as the entrance detector 600, receiving control signals from the AIU 500 along control bus 530 and sending a detection signal to the AIU along bus 570.

By monitoring the entrance detector 600 and the exit detector 700, the AIU 500 can determine the presence of an object even without a signal from the transponder 200. Also, the direction of movement of the object through the portal structure 10 may be determined.

Having a method to sense the presence of an object, separate from the identification signal from the transponder 200, is of value. For instance, if a cow without a transponder or with an inoperative or defective transponder passes through the portal structure 10, the detectors 600 and 700 will indicate that an object is present even though no transponder signal is received. Knowing that a cow has passed through the portal structure 10, the AIU 500 can make sure that the milk output from that cow is not incorrectly assigned to another cow.

Information concerning the direction of movement is also useful, as a cow may become disoriented and walk back through the portal structure 10 instead of to the milking area. Noting a reverse direction of movement would confirm that a repeat identification signal from the transponder 200, indicating the repeat presence of the same cow in the portal structure 10, is not in error.

The AIU 500, which in the present embodiment is a single board micro-computer based on the 8749H Intel computer chip, controls the AEC 400 and the detectors 600 and 700. The operation in the present embodiment of the AIU 500, in the context of a milking parlor, is shown in the flow charts, FIGS. 9-11.

The AIU 500 first determines whether cows are approaching the portal structure 10, for example by monitoring whether an entrance gate (not shown) leading to the portal structure 10 is open. If the entrance gate is open, the AIU 500 sends a control signal to the AEC 400 along control bus 520 directing the AEC 400 power the antenna loop 300 and thus create the electromagnetic field necessary to energize the transponder 200, in the manner previously described.

After a certain delay period, the AIU 500 outputs a second control signal to the AEC 400 along control bus 520 instructing the AEC 400 to remove the electromagnetic field. The AIU 500 will then monitor data bus 540 to see if the AEC is sending a signal along that bus, indicating that the AEC 400 has received a signal from the transponder 200.

If the AIU 500 determines that a signal on data bus 540 is a valid transponder signal the AIU 500 will decode this transponder signal. After the signal is decoded, the AIU 500 will send a signal on bus 510 instructing the entrance detector 600 to turn on. If the AIU determines there is not a valid transponder signal on bus 540 the AIU 500 will also send a signal on bus 510 instructing the entrance detector 600 to turn on. After a specified period, a signal is sent by the AIU 500 along bus 510 instructing the entrance detector 600 to turn off and the AIU 500 monitors bus 550 to determine if the detector 600 has detected the presence of an object. The AIU 500 then in similar fashion sends a signal on bus 530 instructing the exit detector 700 to turn on. After a specified period, a signal is sent by the AIU 500 along bus 550 instructing the exit detector 700 to turn off and the AIU 500 monitors bus 570 to determine if the detector 700 has detected the presence of an object. Based on an analysis of three signals, (1) the signal (if any) from the AEC 400 along data bus 540, (2) the signal (if any) from entrance detector 600 along bus 550 and (3) the signal (if any) from detector 700 along bus 570, the AIU 500 determines if a cow which can be identified has moved in the proper direction through the portal structure 10 to the milking area. If a cow has been identified, the milk output will then be assigned to the correct cow by a parlor computer (not shown) which is connected to the AIU 500.

If the combination of signals indicate some unexpected occurrence, e.g., no valid transponder signal, no exiting from the portal structure 10, incorrect direction of movement through the portal structure 10, a sequential repeat of transponder codes, a valid transponder identification but no signals from the detectors 600 or 700, etc., the AIU 500 will take appropriate action to insure that the milk output is not assigned to the wrong cow. Also, the AIU 500 can alert the milking parlor operator to the problems through audio and visual alarms or the like.

Multiple electronic identification systems of the present invention may be used for large scale identification operations, where all AIU units, each having a separate portal structure and AEC unit, are interconnected and a parlor computer controls all of the AIU units.

Figure 9:
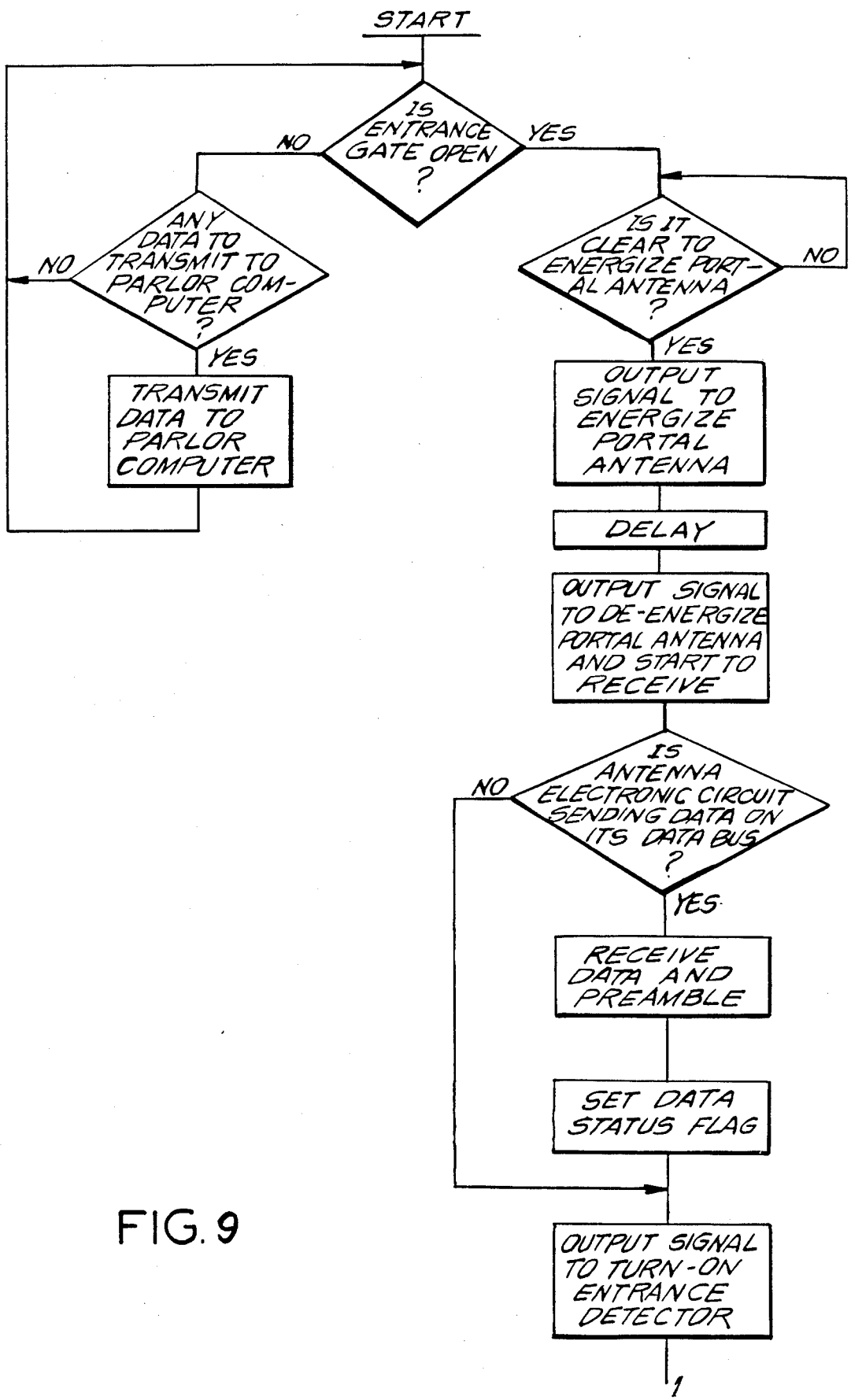
FIGS. 9-11 are flow charts of software programs which may be used by the antenna interface unit shown in FIG. 6.
Figures 10, 11:
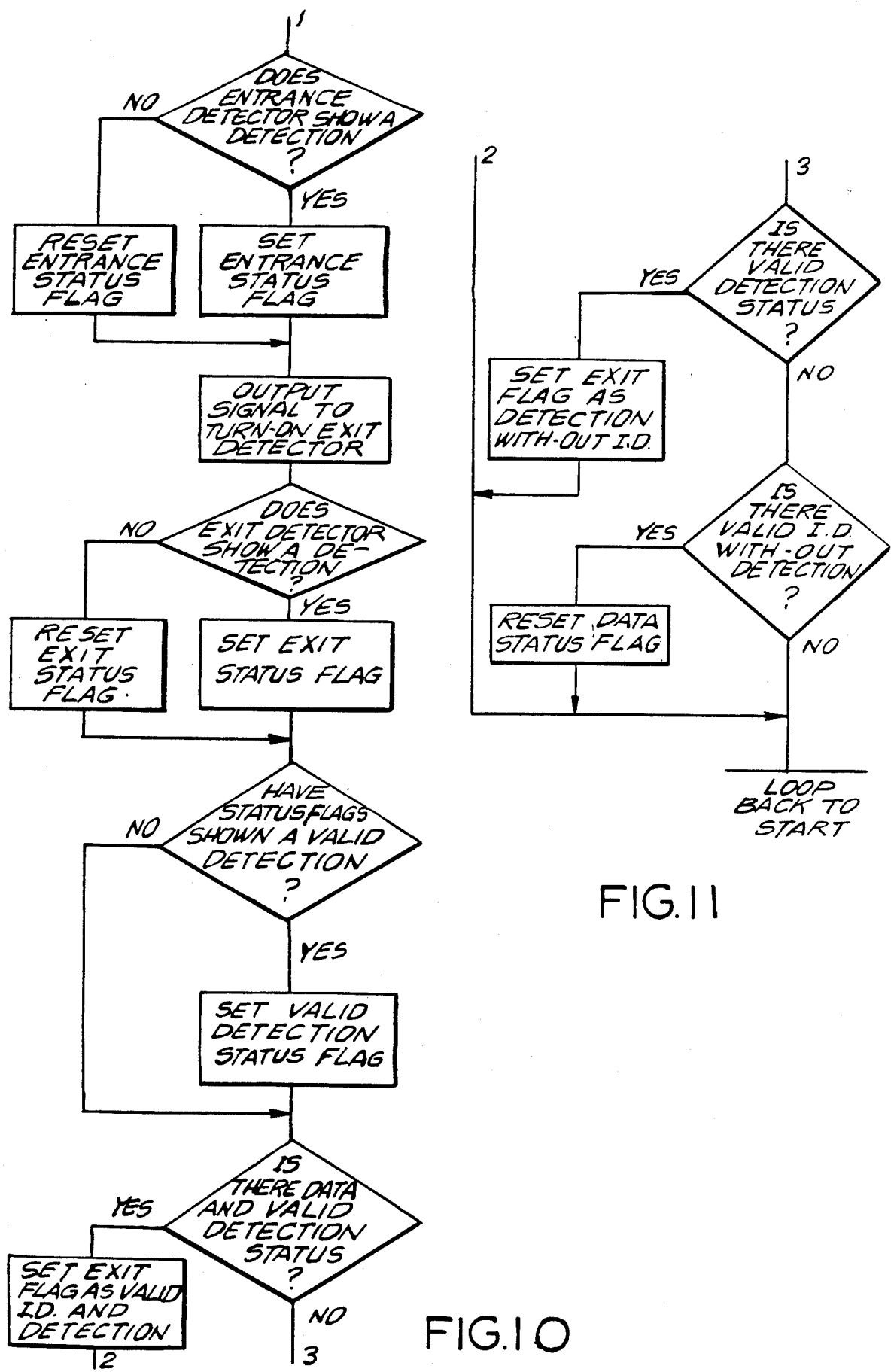

A detailed software listing for the flow chart of FIGS. 9-11 is attached hereto as Appendix A, and is part of the written disclosure of this application.

It will be understood that the identification system of the present invention is not limited to the embodiment described above, but rather is defined by the following claims.

APPENDIX A

```
Π48  :F4:PRTPA1.ASM

IS-II MCS-48/UPI-41 MACRO ASSEMBLER, V4.0

LOC  OBJ        LINE        SOURCE STATEMENT

1  $PAGEWIDTH(80) PAGELENGTH(58)
                 2  ;PORTAL ID PROGRAM
                 3  ;
                 4  ;PROGRAM NAME PORTNT.ASM PORTAL ID UNIT
                 5  ;
                 6  ;       ************************************
                 7  ;       **                                **
                 8  ;       **      PORTAL ID UNIT            **
                 9  ;       **        8304479-02              **
                10  ;       **          REV B                 **
                11  ;       **   T. TOWNSEND AND C. MOORE     **
                12  ;       **         APR.  1986             **
                13  ;       **                                **
                14  ;       ************************************
                15  ;
                16  ;
                17  ;************************************************
                18  ;
                19  ;************************************************
                20  ;              CONSTANTS
                21  ;************************************************
00FB            22  UARTCA  EQU     0FBH      ;USART COMMAND ADDRESS
00FA            23  UARTDA  EQU     0FAH      ;USART DATA ADDRESS
009A            24  UARTMD  EQU     09AH      ;USART MODE WORD
0015            25  UARTCM  EQU     15H       ;USART COMMAND WORD
0000            26  KEYCMD  EQU     00H       ;8279 COMMAND WORD
0020            27  KEYPSC  EQU     20H       ;8279 PRESCALER
00D0            28  KEYBLK  EQU     0D0H      ;8279 BLANKING COMMAND
00FD            29  KEYCA   EQU     0FDH      ;8279 CONTROL ADDRESS
00FC            30  KEYDA   EQU     0FCH      ;8279 DATA ADDRESS
007F            31  RAMT    EQU     7FH       ;TOP OF DATA MEMORY
0042            32  TIMEL   EQU     66        ;DISPLAY TIME  LOW
00F5            33  TIMEH   EQU     245       ;DISPLAY TIME HIGH
0090            34  DSCMD   EQU     90H       ;WRITE DISPLAY COMD
0007            35  DSEL    EQU     07H       ;DEVICE DESELECT CMD
FF83            36  IDTIME  EQU     -125      ;ID TIME (10 MSEC)
00FF            37  ON      EQU     0FFH      ;IDU ON COMMAND
0000            38  OFF     EQU     0         ;IDU OFF COMMAND
FFC4            39  GDLY    EQU     -60       ;GATE DELAY
00FF            40  OPEN    EQU     0FFH      ;GATE OPEN STATUS
0000            41  CLOSED  EQU     0         ;GATE CLOSED STATUS
                42  ONCNT   EQU     -2        ;NUMBER OF ON COUNTS
```

--Copyright 1986, Alfa-Laval Agri, Inc.--

A conformed copy of the first page of Appendix A containing the above legend is attached hereto.

```
0040            47  PWRLIT  EQU     40H       ;POWER LIGHT LED #6
0020            48  GLIGHT  EQU     20H       ;GATE LIGHT  LED #5
FFFD            49  CNT1    EQU     -3        ;IDLE TIME = 5 SECONDS
FFD3            50  CNT2    EQU     -45       ;IDLE TIMER SECONDARY
                51  ;
                52  ;-----------------------------------------------
                53  ;              DATA MEMORY
                54  ;-----------------------------------------------
0000            55  REGB0:  DS      8         ;R0-R7 MAIN REGISTER BANK
0008            56  STACK:  DS      16        ;STACK MEMORY SYSTEM
0018            57  REGB1:  DS      8         ;R0'- R7' ALT REGISTER BANK
0020            58  IDADD:  DS      1         ;IDU ADDRESS LOCATION
```

```
0021          59 BCNT:   DS    1       ;BREQ COUNTER
0022          60 OUTBUF: DS    6       ;UART OUTPUT DATA BUFFER
0028          61 OLDBUF: DS    6       ;OLD OUTPUT BUFFER
002E          62 DSBUF:  DS    6       ;DISPLAY BUFFER
0034          63 INPTR:  DS    1       ;INPUT BUFFER POINTER
0035          64 INBUF:  DS    6       ;INPUT BUFFER
003B          65 CLKTIM: DS    1       ;CYCLE TIMER
003C          66 UARTL:  DS    2       ;SERIAL PREAMBLE & DATA UART
003E          67 PREAMB: DS    1       ;PREAMBLE FLAG
003F          68 DATLOW: DS    2       ;TRANSP. RAW DATA
0041          69 BCDPTR: DS    2       ;TRANSP. BCD DATA
0043          70 BINPTR: DS    2       ;TRANSP BINARY DATA
0045          71 PARITY: DS    1       ;TRANSP PARITY FLAG
0046          72 NEWDAT: DS    2       ;NEW DATA POINTER
0048          73 OLDDAT: DS    2       ;OLD DATA BUFFER
004A          74 IDCNTL: DS    1       ;ID CONTROL FLAG LOCATION
004B          75 DVALID: DS    1       ;DATA VALID FLAG
004C          76 HFBIT:  DS    1       ;HALF BIT FLAG
004D          77 IDBUF:  DS    32      ;IDBUFFER
006D          78 IDQUE:  DS    1       ;ID POINTER QUE
006E          79 BLCNT:  DS    1       ;BLANK TIME COUNTER
006F          80 STATUS: DS    1       ;STATUS LIGHTS
0070          81 DFLAG:  DS    1       ;DETECT FLAG
0071          82 DSTAT:  DS    1       ;DISPLAY STATUS BUFFER
0072          83 PSTATE: DS    1       ;PREVIOUS STATE BUFFER
0073          84 FAILB:  DS    1       ;DETECT FAILURE BUFFER
0074          85 PRESST: DS    1       ;PRESENT STATUS
0075          86 TRCNTR: DS    1       ;TRANSPONDER LOSS COUNTER
0076          87 IDFLG:  DS    1       ;ID FLAG
0077          88 DTIME:  DS    1       ;DETECT TIMER
              89 ; NOTE: THESE LOCATION MUST REMAIN SEQUENTIAL
0078          90 ONDLY1: DS    1       ;SONAR #1 ON DELAY
0079          91 ONDLY2: DS    1       ;SONAR #2 ON DELAY
007A          92 OFDLY1: DS    1       ;SONAR #1 OFF DELAY
007B          93 OFDLY2: DS    1       ;SONAR #2 OFF DELAY
007C          94 IDLECT: DS    1       ;IDLE TIMER
007D          95 IDLEC2: DS    1       ;IDLE TIMER (SECONDARY)
              96 ;
              97
              98 *EJECT
              99 ;
             100 ;
             101 ;----------------------------------------
             102 ;               START OF INIT
             103 ;----------------------------------------
000          104         ORG     00H
000  0409    105         JMP     START           ;RESTART ADDRESS
003          106         ORG     03H             ;EXT INT ROUTINE
003  04FD    107         JMP     EXTINT
007          108         ORG     07H             ;INT TIMER INIT
007  2400    109         JMP     TIMINT          ;ROUTINE
             110 ;
             111 ;
0009 C5      112 START:  SEL     RB0
000A 75      113         ENT0    CLK
000B 2300    114         MOV     A,#00
000D D7      115         MOV     PSW,A
000E 37      116         CPL     A
000F 3A      117         OUTL    P2,A
0010 39      118         OUTL    P1,A
0011 00      119         NOP
0012 00      120         NOP
0013 00      121         NOP
0014 9AF7    122         ANL     P2,#0F7H
             123 ;----------------CLEAR ALL RAM----------------
0016 B87F    124 STRT1:  MOV     R0,#RAMT
0018 BA5E    125         MOV     R2,#RAMT-33
001A 2300    126         MOV     A,#00
001C A0      127 CLRDAT: MOV     @R0,A
001D C8      128         DEC     R0
001E EA1C    129         DJNZ    R2,CLRDAT
             130 INIT51:
0020 9AF3    131         ANL     P2,#0F3H
0022 2300    132         MOV     A,#00H
```

```
0024 91         133          MOVX    @R1,A
0025 91         134          MOVX    @R1,A
0026 91         135          MOVX    @R1,A
0027 2340       136          MOV     A,#40H
0029 91         137          MOVX    @R1,A
002A 239A       138          MOV     A,#09AH
002C 91         139          MOVX    @R1,A           ;INITIALIZE 8251
002D 2315       140          MOV     A,#15H
002F 91         141          MOVX    @R1,A
0030 00         142          NOP
0031 00         143          NOP
0032 8A07       144          ORL     P2,#DSEL
                145 ;
0034 9AFD       146 INIT79:  ANL     P2,#KEYCA       ;INITIALIZE 8279
0036 2300       147          MOV     A,#KEYCMD
0038 91         148          MOVX    @R1,A
0039 2320       149          MOV     A,#KEYFSC
003B 91         150          MOVX    @R1,A
003C 23D0       151          MOV     A,#KEYBLK
003E 91         152          MOVX    @R1,A
003F 8A07       153          ORL     P2,#DSEL        ;DESELECT DEVICE
0041 05         154          EN      I
0042 B821       155          MOV     R0,#BCNT
0044 B0FA       156          MOV     @R0,#0FAH       ;INIT BREQ COUNTER
0046 B84A       157          MOV     R0,#IDCNTL
0048 B0FF       158          MOV     @R0,#ON         ;SET ID CONTROL ON
004A B86E       159          MOV     R0,#BLCNT
004C B0D3       160          MOV     @R0,#BCOUNT     ;INIT BLANK COUNTER
004E BC20       161          MOV     R4,#32
0050 B84D       162          MOV     R0,#IDBUF
0052 B0FF       163 IDCLR:   MOV     @R0,#0FFH       ;CLEAR IDBUFFER
0054 18         164          INC     R0
0055 EC52       165          DJNZ    R4,IDCLR
0057 B86D       166          MOV     R0,#IDQUE
0059 B000       167          MOV     @R0,#0          ;CLEAR POINTER
005B B871       168          MOV     R0,#DSTAT
005D B004       169          MOV     @R0,#04H        ;CLEAR DETECT STATUS
005F B874       170          MOV     R0,#PRESS1      ;LIGHTS AND TURN ON
0061 B000       171          MOV     @R0,#00         ;POWER LIGHT
0063 B872       172          MOV     R0,#PSTATE
0065 B001       173          MOV     @R0,#01H        ;PREVIOUS STATE = 1
0067 B875       174          MOV     R0,#TRCNTR      ;FOR START-UP
0069 B0FE       175          MOV     @R0,#TRCNT      ;TRANSPONDER COUNTER
006B B873       176          MOV     R0,#FAILB       ;SET FAILED BUFFER
006D B000       177          MOV     @R0,#00H
006F B877       178          MOV     R0,#DTIME
0071 B0FE       179          MOV     @R0,#DCOUNT
0073 B878       180          MOV     R0,#ONDLY1
0075 B0FE       181          MOV     @R0,#ONCNT
0077 18         182          INC     R0
0078 B0FE       183          MOV     @R0,#ONCNT
007A 18         184          INC     R0
007B B0FE       185          MOV     @R0,#OFCNT      ;INITIALIZE COUNTERS
007D 18         186          INC     R0
007E B0FE       187          MOV     @R0,#OFCNT
0080 B87C       188          MOV     R0,#IDLECT
0082 B0FD       189          MOV     @R0,#CNT1       ;INITIALIZE SAME LOW
0084 B87D       190          MOV     R0,#IDLEC2      ;TIMER
0086 B0D3       191          MOV     @R0,#CNT2
0088 B400       192          CALL    BLKDIS          ;CLEAR DISPLAY AND
                193                                  ;CHECK SONAR
                194 ;
                195 ;
                196 ;   START FOREGROUND ROUTINES
                197 ;
                198 ;------------------------------------------------
                199 ;            FOREGROUND ROUTINES
                200 ;------------------------------------------------
                201 ;
                202 FORE:
008A B86E       203          MOV     R0,#BLCNT
008C 10         204          INC     @R0
008D F0         205          MOV     A,@R0
008E 9694       206          JNZ     FORE0
```

```
0090 B0D3     207         MOV     @R0,#BCOUNT
0092 B400     208         CALL    BLKDIS
              209 FORE0:
0094 B493     210         CALL    IDTST
0096 94B9     211         CALL    GTEST           ;TEST IF GATE OPEN
0098 FC       212         MOV     A,R4            ;YES- GO TURN-ON LOOP
0099 C6A6     213         JZ      FORE0A
009B 54B7     214         CALL    DELAY           ;NO- DELAY 50 MS
009D B846     215         MOV     R0,#NEWDAT
009F B099     216         MOV     @R0,#99H
00A1 18       217         INC     R0
00A2 B099     218         MOV     @R0,#99H        ;INITIALIZE ID
00A4 048A     219         JMP     FORE
00A6 99BF     220 FORE0A: ANL     P1,#0BFH
00A8 00       221         NOP
00A9 00       222         NOP
00AA 9AFB     223         ANL     P2,#UARTCA
00AC BC14     224 FOREA:  MOV     R4,#20
00AE 81       225 FOREB:  MOVX    A,@R1
00AF 37       226         CPL     A               ;CHECK FOR ACTIVE
00B0 F2AC     227         JB7     FOREA           ;RECEIVERS
00B2 ECAE     228         DJNZ    R4,FOREB        ;CHECK FOR VALID
00B4 8A07     229         ORL     P2,#DSEL        ;INACTIVE
00B6 993F     230         ANL     P1,#3FH
00B8 8940     231         ORL     P1,#40H         ;TURN CONTROL ON
00BA BD02     232 FORE1:  MOV     R5,#2
00BC 94A6     233 FORE2:  CALL    OUTST
00BE EDBC     234         DJNZ    R5,FORE2
00C0 B875     235         MOV     R0,#TRCNTR
00C2 10       236         INC     @R0
00C3 F0       237         MOV     A,@R0
00C4 96CE     238         JNZ     FORE3
00C6 B0FE     239         MOV     @R0,#TRCNT      ;RELOAD TRANSF LOSS
00C8 B874     240         MOV     R0,#PRESST      ;COUNTER
00CA F0       241         MOV     A,@R0
00CB 53FE     242         ANL     A,#0FEH
00CD A0       243         MOV     @R0,A
00CE 8980     244 FORE3:  ORL     P1,#80H         ;TURN CONTROL OFF
00D0 23FF     245         MOV     A,#0FFH
00D2 62       246         MOV     T,A
00D3 25       247         EN      TCNTI
00D4 45       248         STRT    CNT
00D5 BC05     249         MOV     R4,#05H         ;LOOK FOR 5 MS FOR
00D7 54B7     250         CALL    DELAY           ;I.D.
00D9 35       251         DIS     TCNTI
00DA 65       252         STOP    TCNT
00DB D432     253         CALL    STTBL
00DD B40E     254         CALL    DETECT          ;CHECK FOR PRESENTS
00DF BC05     255         MOV     R4,#5
00E1 54B7     256         CALL    DELAY
00E3 048A     257         JMP     FORE
              258 ;----------------------------------
              259 ;   READ IN I.D. ADDRESS SETTINGS
              260 ;      PIN 17 SELECT LINE
              261 ;              NO JUMPER          - LEFT LOWER
              262 ;              JUMPER TO PIN 14 - LEFT UPPER
              263 ;                              15 - RIGHT LOWER
              264 ;                              16 - RIGHT UPPER
              265 ;
              266 ;----------------------------------
              267 CAL:
00E5 9AEF     268         ANL     P2,#0EFH
00E7 BC01     269         MOV     R4,#1
00E9 54B7     270         CALL    DELAY
00EB 09       271         IN      A,P1
00EC 531C     272         ANL     A,#1CH          ;MASK OFF ADDR BITS
00EE 77       273         RR      A
00EF 72F9     274         JB3     RIGHTU          ;IF RIGHT UPPER HANDLE
00F1 4351     275 ADDSET: ORL     A,#51H          ;ADD 51H TO ADDRESS
00F3 B820     276         MOV     R0,#IDADD       ;STORE I.D. ADDRESS
00F5 A0       277         MOV     @R0,A
00F6 8A10     278         ORL     P2,#10H         ;TURN-OFF SELECT
00F8 83       279         RET
00F9 2306     280 RIGHTU: MOV     A,#06H          ;SPECIAL FOR RIGHT UPPER
```

```
00FB 04F1        281         JMP     ADDSET
                 282 ;
                 283 ;----------------------------------------
                 284 ;          EXTERNAL INTERRUPT ROUTINE
                 285 ;----------------------------------------
                 286 ;
                 287 EXTINT:
00FD 15          288         DIS     I
00FE 93          289         RETR
                 290 ;
                 291
                 292 ;----------------------------------------
                 293 ;          DATA INPUT INTERRUPT ROUTINE
                 294 ;----------------------------------------
                 295 ;
0100             296         ORG     100H
                 297
0100 35          298 TIMINT: DIS     TCNTI
0101 00          299         NOP
0102 BC01        300         MOV     R4,#1           ;RETURN WITH ONE COUNT
0104 D5          301         SEL     RB1
0105 AF          302         MOV     R7,A
0106 00          303         NOP
0107 00          304         NOP
0108 00          305         NOP
0109 B84B        306         MOV     R0,#DVALID
010B B0FF        307         MOV     @R0,#0FFH       ;SET DATA VALID = TRUE
010D BC0C        308         MOV     R4,#12          ;PREAMBLE = 12 BITS
010F 5400        309         CALL    RDWORD          ;READ PREAMBLE FRAME
0111 B94B        310         MOV     R1,#DVALID
0113 B83C        311         MOV     R0,#UARTL
0115 F0          312         MOV     A,@R0
0116 D3FF        313         XRL     A,#0FFH
0118 C61C        314         JZ      TIMIN1          ;CHECK PREAMBLE VALIDITY
011A B100        315         MOV     @R1,#0
011C 18          316 TIMIN1: INC     R0
011D F0          317         MOV     A,@R0
011E D3F0        318         XRL     A,#0F0H
0120 C624        319         JZ      TIMIN2
0122 B100        320         MOV     @R1,#0
0124 BB05        321 TIMIN2: MOV     R3,#05          ;DELAY FOR 5 BIT TIMES
0126 BA6B        322 TIM2A:  MOV     R2,#107
0128 4E30        323 TIM2C:  JNT1    TIM2B
012A EA28        324         DJNZ    R2,TIM2C        ;LOOP FOR START BIT
012C EB26        325         DJNZ    R3,TIM2A        ;OR TIME-OUT
012E 24AD        326         JMP     TIMIN7
0130 BA0A        327 TIM2B:  MOV     R2,#10
0132 EA32        328         DJNZ    R2,$
0134 BC10        329         MOV     R4,#16          ;16 BITS IN DATA FRAME
0136 5400        330         CALL    RDWORD          ;READ DATA FRAME
0138 B845        331         MOV     R0,#PARITY
013A F0          332         MOV     A,@R0
013B 5301        333         ANL     A,#01H
013D C645        334         JZ      TIMIN3
013F B84B        335         MOV     R0,#DVALID
0141 B000        336         MOV     @R0,#0
0143 24AD        337         JMP     TIMIN7
0145 B83C        338 TIMIN3: MOV     R0,#UARTL
0147 B944        339         MOV     R1,#BINPTR+1    ;CONVERT DATA TO BINARY
0149 F0          340         MOV     A,@R0
014A 537F        341         ANL     A,#7FH
014C 97          342         CLR     C
014D E7          343         RRC     A
014E A1          344         MOV     @R1,A
014F 18          345         INC     R0
0150 C9          346         DEC     R1
0151 F0          347         MOV     A,@R0
0152 E7          348         RRC     A
0153 A1          349         MOV     @R1,A
0154 B84B        350         MOV     R0,#DVALID
0156 F0          351         MOV     A,@R0
0157 965B        352         JNZ     TIMIN4
0159 24AD        353         JMP     TIMIN7
015B B843        354 TIMIN4: MOV     R0,#BINPTR
```

```
015D B941      355           MOV    R1,#BCDPTR
015F 547D      356           CALL   BINBCD
0161 B841      357           MOV    R0,#BCDPTR
0163 F400      358           CALL   DSPLAY
0165 B842      359           MOV    R0,#BCDPTR+1
0167 B947      360           MOV    R1,#NEWDAT+1
0169 F0        361           MOV    A,@R0
016A D1        362           XRL    A,@R1
016B 9675      363           JNZ    TIM6A
016D C8        364           DEC    R0
016E C9        365           DEC    R1
016F F0        366           MOV    A,@R0
0170 D1        367           XRL    A,@R1
0171 9675      368           JNZ    TIM6A
0173 249D      369           JMP    TIM6D
               370  TIM6A:
0175 B873      371           MOV    R0,#FAILB
0177 F0        372           MOV    A,@R0
0178 9691      373           JNZ    TIM6BA
               374  TIM6B:
017A B876      375           MOV    R0,#IDFLG
017C B0FF      376           MOV    @R0,#0FFH;
017E B848      377           MOV    R0,#OLDDAT
0180 F0        378           MOV    A,@R0
0181 18        379           INC    R0
0182 40        380           ORL    A,@R0
0183 C693      381           JZ     TIM6C
0185 B874      382           MOV    R0,#PRESST
0187 B005      383           MOV    @R0,#05
0189 D485      384           CALL   ACPTID           ;ACCEPT PREVIOUS LOW NUMBER
018B B872      385           MOV    R0,#PSTATE
018D B006      386           MOV    @R0,#6           ;NEW STATE = 6
018F 2493      387           JMP    TIM6C
               388  TIM6BA:
0191 D493      389           CALL   ACPNEW           ;ACCEPT NEW TRANS #
               390                                   ;IF NO SENSING
               391  TIM6C:
0193 B946      392           MOV    R1,#NEWDAT
0195 B841      393           MOV    R0,#BCDPTR
0197 F0        394           MOV    A,@R0
0198 A1        395           MOV    @R1,A
0199 18        396           INC    R0
019A 19        397           INC    R1
019B F0        398           MOV    A,@R0
019C A1        399           MOV    @R1,A
               400  TIM6D:
019D B875      401           MOV    R0,#TRCNTR
019F B0FE      402           MOV    @R0,#TRCNT       ;RESET TRANS LOSS
01A1 B874      403           MOV    R0,#PRESST       ;COUNTER
01A3 F0        404           MOV    A,@R0
01A4 4301      405           ORL    A,#01
01A6 A0        406           MOV    @R0,A
01A7 D432      407           CALL   STTBL
01A9 B86E      408           MOV    R0,#BLCNT
01AB B0D3      409           MOV    @R0,#BCOUNT
               410  TIMIN7:
01AD FF        411  TIMIN8:  MOV    A,R7
01AE 93        412           RETR
               413  ;
               414  ;----------------------------------------
               415  ;          DATA INPUT TEST ROUTINE
               416  ;----------------------------------------
               417  ;
               418
0078           419  COUNT2   EQU    120
               420
               421  INTST:
01AF BC00      422           MOV    R4,#0
01B1 BE78      423           MOV    R6,#COUNT2
01B3 8A07      424  INTS1:   ORL    P2,#DSEL
01B5 9AFB      425           ANL    P2,#UARTCA
01B7 80        426           MOVX   A,@R0
```

```
1B8 AA          427         MOV     R2,A
1B9 37          428         CPL     A
1BA 32C8        429         JB1     INTS2           ;INPUT DATA PEND
1BC 9AFA        430         ANL     P2,#UARTDH      ;YES, READ BYTE
1BE 80          431         MOVX    A,@R0
1BF AB          432         MOV     R3,A            ;SAVE IN R3
1C0 FA          433         MOV     A,R2
1C1 5338        434         ANL     A,#38H          ;TRANSMISSION ERROR
1C3 AA          435         MOV     R2,A
1C4 BCFF        436         MOV     R4,#0FFH        ;CHARACTER FLAG
1C6 BE01        437         MOV     R6,#1
1C8 8A07        438 INTS2:  ORL     P2,#DSEL
1CA EEB3        439         DJNZ    R6,INTS1        ;WAIT FOR TIMEOUT
1CC FC          440         MOV     A,R4            ;RETURN WITH DATA
1CD 83          441         RET                     ;FLAG IN ACC
                442
                443
0200            444         ORG     0200H
                445
                446
0200 8A20       447 RDWORD: ORL     P2,#20H         ;SET PIN 18 HIGH
0202 B84C       448         MOV     R0,#HFBIT
0204 B000       449         MOV     @R0,#0
0206 B845       450         MOV     R0,#PARITY      ;INITIALIZE PARITY
0208 B000       451         MOV     @R0,#0
020A B83C       452         MOV     R0,#UARTL
020C B000       453         MOV     @R0,#0          ;INITIALIZE SERIAL INPUT
020E 18         454         INC     R0              ;WORD
020F B000       455         MOV     @R0,#0
0211 BA0F       456         MOV     R2,#15          ;DELAY FOR 1/4 BIT TIME
0213 EA13       457         DJNZ    R2,$
0215 461D       458         JNT1    RDWD1
0217 B84B       459         MOV     R0,#DVALID
0219 B000       460         MOV     @R0,#0
021B 4447       461         JMP     RDWD4
021D 544A       462 RDWD1:  CALL    RDBIT
021F 1227       463         JB0     RDWD2           ;CHECK FOR VALID
0221 B84B       464         MOV     R0,#DVALID      ;MANCHESTER DATA BIT
0223 B000       465         MOV     @R0,#0
0225 4447       466         JMP     RDWD4
0227 E62C       467 RDWD2:  JNC     RDWD3
0229 B845       468         MOV     R0,#PARITY
022B 10         469         INC     @R0
022C B83C       470 RDWD3:  MOV     R0,#UARTL
022E F0         471         MOV     A,@R0
022F E7         472         RRC     A
0230 A0         473         MOV     @R0,A
0231 18         474         INC     R0
0232 F0         475         MOV     A,@R0
0233 E7         476         RRC     A
0234 A0         477         MOV     @R0,A
0235 BA3E       478         MOV     R2,#62          ;DELAY FROM 1/2
0237 EA37       479         DJNZ    R2,$            ;BIT TIMES
0239 545D       480         CALL    RDHBIT          ;READ HALF BIT DATA
023B B84B       481         MOV     R0,#DVALID
023D F0         482         MOV     A,@R0
023E C647       483         JZ      RDWD4
0240 00         484         NOP
0241 BA47       485         MOV     R2,#71
0243 EA43       486         DJNZ    R2,$            ;DELAY ANOTHER 1/2 B
0245 EC1D       487         DJNZ    R4,RDWD1        ;READ REST OF DATA
0247 9ADF       488 RDWD4:  ANL     P2,#0DFH        ;SET PIN 18 LOW
0249 83         489         RET
                490
024A B84C       491 RDBIT:  MOV     R0,#HFBIT
024C 2300       492         MOV     A,#0
024E 9ADF       493         ANL     P2,#0DFH        ;BENCHMARK FLAG
0250 97         494         CLR     C
0251 A7         495         CPL     C
0252 4655       496         JNT1    RDBIT1
0254 97         497         CLR     C
0255 F7         498 RDBIT1: RLC     A
0256 8A20       499         ORL     P2,#20H         ;BENCHMARK FLAG
0258 A9         500         MOV     R1,A
```

```
0259 E7      501           RRC     A
025A F0      502           MOV     A,@R0       ;RET WITH BIT IN CARRY
025B D9      503           XRL     A,R1        ;A = 1 FOR VALID DATA
025C 83      504           RET
             505
             506  RDHBIT:
025D B84C    507           MOV     R0,#HFBIT
025F B000    508           MOV     @R0,#0
0261 9ADF    509           ANL     P2,#0DFH
0263 BA20    510           ORL     P2,#20H
0265 5E6A    511           JT1     RDHB1
0267 B001    512           MOV     @R0,#01
0269 83      513           RET
026A 00      514  RDHB1:   NOP
026B 00      515           NOP
026C 83      516           RET
             517
             518  BUSFRE:
026D 83      519           RET
             520 ;
             521
             522 ;
             523 ;----------------------------------------
             524 ;        TEST FOR LEADING ZERO'S FOR DISPLAY
             525 ;----------------------------------------
             526 ;
             527  BNKTST:
026E BA03    528           MOV     R2,#03H     ;TEST FOR LEADING
0270 B831    529           MOV     R0,#DSBUF+3 ;ZEROES
0272 F0      530  BKTST1:  MOV     A,@R0
0273 D33F    531           XRL     A,#3FH
0275 967C    532           JNZ     BKTST2
0277 B000    533           MOV     @R0,#00H    ;CHANGE TO "BLANK"
0279 C8      534           DEC     R0
027A EA72    535           DJNZ    R2,BKTST1
027C 83      536  BKTST2:  RET
             537 ;
             538 ;----------------------------------------
             539 ;        BINBCD -- CONVERTS TRANSPONDER TO BCD
             540 ;----------------------------------------
             541
             542  BINBCD:
027D B100    543           MOV     @R1,#0
027F 19      544           INC     R1
0280 B100    545           MOV     @R1,#0      ;CLR BCD POINTER
0282 BA10    546           MOV     R2,#16      ;LOCATION
0284 18      547           INC     R0          ;16 BITS TO CONVERT
0285 C8      548  BIN1:    DEC     R0
0286 C9      549           DEC     R1
0287 97      550           CLR     C
0288 F0      551           MOV     A,@R0
0289 F7      552           RLC     A
028A A0      553           MOV     @R0,A
028B 18      554           INC     R0
028C F0      555           MOV     A,@R0
028D F7      556           RLC     A
028E A0      557           MOV     @R0,A
028F F1      558           MOV     A,@R1
0290 71      559           ADDC    A,@R1
0291 57      560           DA      A
0292 A1      561           MOV     @R1,A
0293 19      562           INC     R1
0294 F1      563           MOV     A,@R1
0295 71      564           ADDC    A,@R1
0296 57      565           DA      A
0297 A1      566           MOV     @R1,A
0298 EA85    567           DJNZ    R2,BIN1
029A 83      568           RET
             569
             570
             571 ;----------------------------------------
             572 ;                POP ROUTINE
             573 ;----------------------------------------
             574
```

```
                575 POP:
029B BA1C       576         MOV     R2,#28
029D B84D       577         MOV     R0,#IDBUF
029F B94F       578         MOV     R1,#IDBUF+2
02A1 F1         579 POP1:   MOV     A,@R1
02A2 A0         580         MOV     @R0,A           ;POP OFF 1ST NUMBER
02A3 18         581         INC     R0
02A4 19         582         INC     R1
02A5 EAA1       583         DJNZ    R2,POP1
02A7 B0FF       584         MOV     @R0,#0FFH
02A9 18         585         INC     R0
02AA B0FF       586         MOV     @R0,#0FFH
02AC B86D       587         MOV     R0,#IDQUE
02AE F0         588         MOV     A,@R0
02AF C6B5       589         JZ      POP2
02B1 07         590         DEC     A               ;RESET QUE POINTER
02B2 C6B5       591         JZ      POP2
02B4 07         592         DEC     A
02B5 A0         593 POP2:   MOV     @R0,A
02B6 83         594         RET
                595
                596 ;--------------------------------------------
                597 ;           1 MSEC DELAY
                598 ;   ON ENTRY R4 HOLDS NUMBER OF MSEC FOR DELAY
                599 ;--------------------------------------------
                600
                601 DELAY:
02B7 00         602         NOP
02B8 00         603         NOP
02B9 BEA7       604         MOV     R6,#167         ;1 MSEC DELAY
02BB EEBB       605         DJNZ    R6,*
02BD 00         606         NOP
02BE 00         607         NOP
02BF ECB7       608         DJNZ    R4,DELAY        ;NUMBER OF MSEC
02C1 83         609         RET
                610
                611 ;--------------------------------------------
                612 ;       RSTAT-- RESET ZONE1 OR ZONE2 STATUS FLAG
                613 ;       R4 CONTAINS BIT MASK
                614 ;--------------------------------------------
                615 ;
                616
                617 RSTAT:
02C2 B874       618         MOV     R0,#PRESST
02C4 F0         619         MOV     A,@R0
02C5 5C         620         ANL     A,R4            ;RESET APP. BIT
02C6 A0         621         MOV     @R0,A
02C7 D432       622         CALL    STTBL           ;UPDATE STATE TABLE
02C9 83         623         RET
                624
                625 ;--------------------------------------------
                626 ;       SSTAT-- SETS ZONE1 OR ZONE2 STATUS FLAGS
                627 ;       R4 CONTAINS BIT TO BE SET
                628 ;--------------------------------------------
                629 ;
                630 SSTAT:
02CA B874       631         MOV     R0,#PRESST
02CC F0         632         MOV     A,@R0
02CD 4C         633         ORL     A,R4            ;SET APP. BIT
02CE A0         634         MOV     @R0,A
02CF D432       635         CALL    STTBL           ;UPDATE STATE TABLE
02D1 83         636         RET
                637
                638 ;--------------------------------------------
                639 ;           SONAR TEST
                640 ;   TEST FOR DEFECTIVE SONAR DETECTOR
                641 ;--------------------------------------------
                642 ;
                643 STEST:
02D2 B873       644         MOV     R0,#FAILB
02D4 B0FF       645         MOV     @R0,#0FFH
02D6 9A3F       646         ANL     P2,#3FH
```

```
02D8 00      647            NOP
02D9 00      648            NOP
02DA 09      649            IN      A,P1
02DB 37      650            CPL     A
02DC 5303    651            ANL     A,#03H
02DE 96ED    652            JNZ     STEST1          ;LOOK FOR MISSING OR
02E0 8AC0    653            ORL     P2,#0C0H        ;LOCK-UP OF EITHER
02E2 BC14    654            MOV     R4,#20          ;SONAR
02E4 5487    655            CALL    DELAY           ;LOOK FOR ECHO UP TO
02E6 09      656            IN      A,P1            ;15 FEET
02E7 9A3F    657            ANL     P2,#3FH         ;TURN OFF BOTH SONARS
02E9 5303    658            ANL     A,#03
02EB C6F1    659            JZ      STEST2          ;CHECK FOR RESPONSE FROM
             660                                    ;BOTH SONARS
             661    STEST1:
02ED B873    662            MOV     R0,#FAILB
02EF B0FF    663            MOV     @R0,#0FFH       ;FAILED SET FLAG
02F1 83      664    STEST2: RET
             665
0400         666            ORG     0400H
             667    ;
             668    ;---------------------------------------------
             669    ;       DECODE--INPUT DECODE ROUTINE
             670    ;               FROM PARLOR CONTROLLER
             671    ;---------------------------------------------
             672    ;
             673    DECODE:
0400 BC0F    674            MOV     R4,#15
0402 FA      675    DECO1:  MOV     A,R2
0403 965B    676            JNZ     DECO4
0405 FB      677            MOV     A,R3
0406 37      678            CPL     A
0407 125B    679            JB0     DECO4           ;CHECK FOR ADDRESS ERR
0409 FB      680            MOV     A,R3
040A B820    681            MOV     R0,#IDADD       ;OWN ADDRESS?
040C D0      682            XRL     A,@R0
040D 965B    683            JNZ     DECO4
040F 34AF    684            CALL    INTST           ;WAIT FOR BUS FREE
0411 BC0C    685            MOV     R4,#12          ;MESSAGE
0413 C65B    686            JZ      DECO4
0415 FA      687            MOV     A,R2
0416 965B    688            JNZ     DECO4
0418 FB      689            MOV     A,R3
0419 D37E    690            XRL     A,#7EH
041B C6E4    691            JZ      DECO0           ;BUS FREE OUTPUT ID DATA
041D FB      692            MOV     A,R3
041E D378    693            XRL     A,#78H          ;CHECK FOR REPEAT FROM
0420 C64C    694            JZ      DECO2B          ;PC REPEAT, OUTPUT SAME
0422 845B    695            JMP     DECO4           ;VALUE ELSE ABORT
0424 B822    696    DECO0:  MOV     R0,#OUTBUF
0426 B920    697            MOV     R1,#IDADD
0428 F1      698            MOV     A,@R1
0429 A0      699            MOV     @R0,A
042A 18      700            INC     R0
042B B006    701            MOV     @R0,#06H
042D 18      702            INC     R0
042E B94D    703            MOV     R1,#IDBUF
0430 F1      704            MOV     A,@R1
0431 530F    705            ANL     A,#0FH
0433 E7      706            RL      A
0434 A0      707            MOV     @R0,A
0435 18      708            INC     R0
0436 F1      709            MOV     A,@R1
0437 53F0    710            ANL     A,#0F0H
0439 47      711            SWAP    A
043A E7      712            RL      A
043B A0      713            MOV     @R0,A
043C 18      714            INC     R0
043D 19      715            INC     R1
043E F1      716            MOV     A,@R1
043F 530F    717            ANL     A,#0FH
0441 E7      718            RL      A
```

```
0442 A0        719         MOV     @R0,A
0443 18        720         INC     R0
0444 F1        721         MOV     A,@R1
0445 53F0      722         ANL     A,#0F0H
0447 47        723         SWAP    A
0448 E7        724         RL      A
0449 A0        725         MOV     @R0,A
044A 9467      726 DECO2:  CALL    XFER            ;TRANSFER OUTPUT BUFFER
               727                                 ;TO OLDBUFFER
044C BA06      728 DECO2B: MOV     R2,#6
044E B822      729         MOV     R0,#OUTBUF      ;TRANSMIT ID DATA
0450 F430      730         CALL    XMIT
0452 34AF      731         CALL    INTST           ;CHECK FOR REPEAT
0454 BC01      732         MOV     R4,#1           ;REQUEST FROM PC
0456 9602      733         JNZ     DECO1
0458 5498      734         CALL    POP             ;INFO RECEIVED,
045A 83        735         RET                     ;   POP STACK
045B 5487      736 DECO4:  CALL    DELAY           ;POP ID OFF STACK
045D 83        737 DECO5:  RET
               738
               739
045E B84A      740 TURNON: MOV     R0,#IDCNTL
0460 B0FF      741         MOV     @R0,#ON
0462 B84A      742 TNOFF:  MOV     R0,#IDCNTL
0464 B000      743         MOV     @R0,#OFF
0466 83        744         RET
               745
               746 XFER:
0467 B822      747         MOV     R0,#OUTBUF
0469 B928      748         MOV     R1,#OLDBUF
046B BA06      749         MOV     R2,#6
046D F0        750 XFER1:  MOV     A,@R0
046E A1        751         MOV     @R1,A
046F EA6D      752         DJNZ    R2,XFER1
0471 83        753         RET
               754
               755 ;----------------------------------------
               756 ;       DATOUT--DATA OUTPUT ROUTINE
               757 ;----------------------------------------
               758
00A5           759 COUNT   EQU     165             ;BUS QUIET BASE TIME
00FA           760 COUNT1  EQU     250             ;3 MSEC TIMOUT FOR XF.1
               761
               762 DATOUT:
0472 14E5      763         CALL    CAL
0474 B820      764         MOV     R0,#IDADD
0476 F0        765         MOV     A,@R0
0477 77        766         RR      A
0478 5303      767         ANL     A,#03
047A AA        768         MOV     R2,A
047B 1A        769         INC     R2
047C 23A5      770         MOV     A,#COUNT
047E 0305      771 DAT1:   ADD     A,#05
0480 EA7E      772         DJNZ    R2,DAT1
0482 AB        773         MOV     R3,A
0483 BCFA      774         MOV     R4,#COUNT1
0485 EC89      775 DAT2:   DJNZ    R4,DAT2A
0487 84A1      776         JMP     DAT5
0489 FB        777 DAT2A:  MOV     A,R3
048A AA        778         MOV     R2,A
048B 8E85      779 DAT3:   JNI     DAT2
048D 00        780         NOP
048E 00        781         NOP
048F 00        782         NOP
0490 00        783         NOP
0491 EA8B      784         DJNZ    R2,DAT3
0493 B820      785         MOV     R0,#IDADD
0495 BA01      786         MOV     R2,#1
0497 F430      787         CALL    XMIT
0499 34AF      788 DAT4:   CALL    INTST
049B C6A1      789         JZ      DAT5
049D 9400      790         CALL    DECODE
049F 84A5      791         JMP     DAT6
04A1 BC0E      792 DAT5:   MOV     R4,#14
```

```
04A3 54B7           793            CALL    DELAY
04A5 83             794 DAT6:      RET
                    795 ;
                    796 ;----------------------------------------
                    797 ;          OUTPUT DATA TEST
                    798 ;----------------------------------------
                    799
                    800 OUTST:
04AE B84D           801            MOV     R0,#IDBUF
04A8 F0             802            MOV     A,@R0
04A9 37             803            CPL     A
04AA C6B0           804            JZ      OUTS1
04AC 9472           805            CALL    DATOUT
04AE 84B8           806            JMP     OUTS3
04B0 B8ED           807 OUTS1:     MOV     R0,#IDQUE
04B2 B000           808            MOV     @R0,#0
04B4 BC12           809 OUTS2:     MOV     R4,#18          ;18 MSEC DELAY
04B6 54B7           810            CALL    DELAY
04B8 83             811 OUTS3:     RET
                    812
                    813
                    814 ;****************************************
                    815 ;          GATE TEST ROUTINE
                    816 ;  CALLED FROM FORE GROUND
                    817 ;
                    818 ;****************************************
                    819
04B9 09             820 GTEST:     IN      A,P1            ;TEST IF GATE SWITCH
04BA 37             821            CPL     A
04BB B2D4           822            JB5     GTEST1          ;CLOSED SET TO BYPASS
04BD BC01           823            MOV     R4,#01          ;DELAY 1 MSEC
04BF 54B7           824            CALL    DELAY
04C1 09             825            IN      A,P1            ;RE-TEST GATE SWITCH
04C2 37             826            CPL     A
04C3 B2D4           827            JB5     GTEST1
04C5 99BF           828            ANL     P1,#0BFH        ;SET SYNC LINE HIGH
04C7 94AE           829            CALL    OUTST           ;CK FOR DATA OUT
04C9 B671           830            MOV     R0,#DSTAT       ;TURN-OFF GATE LIGHT
04CB F0             831            MOV     A,@R0
04CC 5304           832            ANL     A,#04H
04CE A0             833            MOV     @R0,A
04CF B4B8           834            CALL    TEST1           ;UPDATE PANEL LIGHTS
04D1 BC32           835            MOV     R4,#50          ;SET DELAY FOR 50 MSEC
04D3 83             836            RET
04D4 BC00           837 GTEST1:    MOV     R4,#0
04D6 B673           838            MOV     R0,#FAILB       ;CHECK IF SONAR LIGHTS
04D8 F0             839            MOV     A,@R0           ;SHOULD BE LIT
04D9 C6DD           840            JZ      GTEST2
04DB BCC0           841            MOV     R4,#0C0H
04DD B871           842 GTEST2:    MOV     R0,#DSTAT       ;TURN-ON GATE LIGHT
04DF F0             843            MOV     A,@R0
04E0 4320           844            ORL     A,#20H
04E2 4C             845            ORL     A,R4
04E3 A0             846            MOV     @R0,A
04E4 B4B8           847            CALL    TEST1
04E6 BC00           848            MOV     R4,#0           ;SET TO TURN ON LOOP
04E8 83             849            RET
                    850
                    851
                    852 ;----------------------------------------
                    853 ;    BLANK DISPLAY AFTER 400 MSEC
                    854 ;    AND TEST FOR WORKING SONARS
                    855 ;----------------------------------------
                    856 ;
0500                857            ORG     500H
                    858 BLKDIS:
0500 54D2           859            CALL    STEST           ;TEST FOR WORKING SONAR
0502 B82E           860            MOV     R0,#DSBUF       ;CLEAR DISPLAY BUFFER
0504 BD05           861            MOV     R5,#05
0506 B000           862 LPBLK:     MOV     @R0,#0H
0508 18             863            INC     R0
```

```
0509 ED06      864       DJNZ    R5,LPBLK
050B F41C      865 BKDIS2: CALL   DSWR2              ;OUTPUT TO DISPLAY
050D 83        866       RET
               867
               868
               869 ;----------------------------------------
               870 ; DETECTION ROUTINE FOR COW PRESENTS
               871 ; S.U. PINS 20 19    TURN ON SIGNALS PORT 2,BITS 7 6
               872 ;      PINS 13 12    ECHO SIGNALS    PORT 1,BITS 1 0
               873 ;----------------------------------------
               874 ;
               875
               876
050E B877      877 DETECT: MOV    R0,#DTIME
0510 10        878       INC     @R0
0511 F0        879       MOV     A,@R0
0512 C616      880       JZ      DETCT1
0514 A488      881       JMP     TEST1
               882 DETCT1:
0516 B0FE      883       MOV     @R0,#DCOUNT
0518 9A3F      884       ANL     P2,#3FH            ;RESET BOTH XMIT
051A BC01      885       MOV     R4,#1              ;CONTROLS
051C 54B7      886       CALL    DELAY              ;DELAY FOR 1 MSEC
051E 8A40      887       ORL     P2,#040H           ;TURN-ON ENTRANCE
0520 BC05      888       MOV     R4,#5              ;SONAR
0522 54B7      889       CALL    DELAY
0524 09        890       IN      A,P1
0525 323D      891       JB1     NOPRS1
               892
0527 B878      893       MOV     R0,#ONDLY1
0529 10        894       INC     @R0
052A F0        895       MOV     A,@R0
052B 9651      896       JNZ     RSEN2              ;CHECK FOR ON DELAY
52D B87A       897       MOV     R0,#OFDLY1
52F B0FE       898       MOV     @R0,#OFCNT         ;RESET OFF COUNTER
531 B871       899       MOV     R0,#DSTAT
533 F0         900       MOV     A,@R0
534 4380       901       ORL     A,#80H             ;PRESENTS DETECTED
536 A0         902       MOV     @R0,A              ;TURN-ON ENTRANCE
537 BC02       903       MOV     R4,#02             ;LIGHT
539 54CA       904       CALL    SSTAT              ;UPDATE STATE TABLE
53B A451       905       JMP     RSEN2
               906
               907 NOPRS1:
               908
53D B87A       909       MOV     R0,#OFDLY1
53F 10         910       INC     @R0
540 F0         911       MOV     A,@R0
541 9651       912       JNZ     RSEN2
543 B878       913       MOV     R0,#ONDLY1
545 B0FE       914       MOV     @R0,#ONCNT
547 B871       915       MOV     R0,#DSTAT
549 F0         916       MOV     A,@R0
54A 537F       917       ANL     A,#7FH             ;TURN OFF LED
54C A0         918       MOV     @R0,A
54D BCFD       919       MOV     R4,#0FDH
54F 54C2       920       CALL    RSTAT              ;RESET ENTRANCE STATUS
               921
               922 RSEN2:
0551 BC01      923       MOV     R4,#1
0553 54B7      924       CALL    DELAY              ;PAUSE 1 MSEC
0555 8A80      925       ORL     P2,#80H            ;TURN ON EXIT S...
0557 BC05      926       MOV     R4,#5
0559 54B7      927       CALL    DELAY              ;WAIT FOR ECHO
055B 09        928       IN      A,P1
055C 1274      929       JB0     NOPRS2
               930
055E B879      931       MOV     R0,#ONDLY2
0560 10        932       INC     @R0
0561 F0        933       MOV     A,@R0
0562 9688      934       JNZ     TEST1
0564 B87B      935       MOV     R0,#OFDLY2
```

```
0566 B0FE      936         MOV     @R0,#OFCNT
0568 B871      937         MOV     R0,#DSTAT
056A F0        938         MOV     A,@R0
056B 4340      939         ORL     A,#40H          ;SET LED #2 ON
056D A0        940         MOV     @R0,A
056E BC04      941         MOV     R4,#04H
0570 54CA      942         CALL    SSTAT           ;UPDATE STATE TABLE
0572 A488      943         JMP     TEST1
               944
               945 NOPRS2:
0574 B87B      946         MOV     R0,#OFDLY2
0576 10        947         INC     @R0
0577 F0        948         MOV     A,@R0
0578 9688      949         JNZ     TEST1
057A B879      950         MOV     R0,#ONDLY2
057C B0FE      951         MOV     @R0,#ONCNT
057E B671      952         MOV     R0,#DSTAT
0580 F0        953         MOV     A,@R0
0581 53BF      954         ANL     A,#0BFH         ;TURN LED #2 OFF
0583 A0        955         MOV     @R0,A
0584 BCFB      956         MOV     R4,#0FBH
0586 54C2      957         CALL    RSTAT           ;UPDATE STATE TABLE
               958
               959 TEST1:
0588 B871      960         MOV     R0,#DSTAT
058A F0        961         MOV     A,@R0
058B B832      962         MOV     R0,#DSBUF+4
058D A0        963         MOV     @R0,A
058E 18        964         INC     R0
058F A0        965         MOV     @R0,A
0590 F41C      966         CALL    DSWR2           ;UPDATE PANEL LEDS
0592 83        967         RET
               968
               969 IDTST:
0593 B87D      970         MOV     R0,#IDLEC2
0595 10        971         INC     @R0
0596 F0        972         MOV     A,@R0
0597 96AA      973         JNZ     IDTS2           ; CHECKS IF COM STILL
0599 B0D3      974         MOV     @R0,#CNT2       ; STANDING IN LOOP, IF
059B B87C      975         MOV     R0,#IDLECT      ; SO, THEN CLEAR OUT NEW
059D 10        976         INC     @R0             ; DATA AND SEND TO PRP U
059E F0        977         MOV     A,@R0           ; CONTROLLER
059F 96AA      978         JNZ     IDTS2
05A1 B0FD      979         MOV     @R0,#CNT1
05A3 B846      980         MOV     R0,#NEWDAT
05A5 B099      981         MOV     @R0,#099H
05A7 18        982         INC     R0
05A8 B099      983         MOV     @R0,#099H
05AA 83        984 IDTS2:  RET
               985
               986 ;
               987 ;
               988 ;------------------------------------------------
               989 ;           INPUT DATA CONVERSION ROUTINE
               990 ;------------------------------------------------
               991 ;
0600           992         ORG     600H
               993
               994 DATCON:
0600 B837      995         MOV     R0,#INBUF+2
0602 F0        996         MOV     A,@R0
0603 77        997         RR      A
0604 530F      998         ANL     A,#0FH
0606 AB        999         MOV     R3,A
0607 18        1000        INC     R0
0608 F0        1001        MOV     A,@R0
0609 E7        1002        RL      A
060A 53F0      1003        ANL     A,#0F0H
060C DB        1004        XRL     A,R3
060D A1        1005        MOV     @R1,A
060E 19        1006        INC     R1
060F F0        1007        MOV     A,@R0
0610 E7        1008        RL      A
```

```
0611 530C    1009            ANL     A,#0CH
0613 47      1010            SWAP    A
0614 AB      1011            MOV     R3,A
0615 18      1012            INC     R0
0616 F0      1013            MOV     A,@R0
0617 77      1014            RR      A
0618 533F    1015            ANL     A,#3FH
061A DB      1016            XRL     A,R3
061B A1      1017            MOV     @R1,A
061C 83      1018            RET
             1019 ;
             1020 ;------------------------------------
             1021 ;       PUSH-- STORES TRANSPONDERS FIFO
             1022 ;
             1023 ;  R4-- TRANSPONDER # MSB
             1024 ;  R3-- TRANSPONDER # LSB
             1025 ;------------------------------------
             1026
             1027 PUSH:
061D B86D    1028            MOV     R0,#IDQUE
061F F0      1029            MOV     A,@R0
0620 034D    1030            ADD     A,#IDBUF
0622 A9      1031            MOV     R1,A
0623 FB      1032            MOV     A,R3
0624 A1      1033            MOV     @R1,A           ;TRANS # LSB
0625 19      1034            INC     R1
0626 FC      1035            MOV     A,R4
0627 A1      1036            MOV     @R1,A           ;TRANS # MSB
0628 10      1037            INC     @R0
0629 10      1038            INC     @R0             ;NEXT AVAILABLE LOC.
062A F0      1039            MOV     A,@R0
062B 03E0    1040            ADD     A,#-32          ;OVERFLOW
062D E631    1041            JNC     PUSH1
062F B000    1042            MOV     @R0,#0
0631 83      1043 PUSH1:     RET
             1044
             1045 ;------------------------------------
             1046 ;           STATE TABLE ROUTINE
             1047 ;------------------------------------
             1048
             1049 STTBL:
0632 B873    1050            MOV     R0,#FAILE
0634 F0      1051            MOV     A,@R0
0635 966C    1052            JNZ     STTBL1
0637 B872    1053            MOV     R0,#PSTATE
0639 F0      1054            MOV     A,@R0
063A AC      1055            MOV     R4,A
063B 03F9    1056            ADD     A,#-7
063D C643    1057            JZ      STTB0
063F 07      1058            DEC     A               ;IF STATE 8 OR 9
0640 07      1059            DEC     A
0641 9652    1060            JNZ     STTB1
0643 B876    1061 STTB0:     MOV     R0,#IDFLG
0645 F0      1062            MOV     A,@R0
0646 CE52    1063            JZ      STTB1
0648 B84E    1064            MOV     R0,#NEWDAT
064A B948    1065            MOV     R1,#OLDDAT
064C F0      1066            MOV     A,@R0
064D A1      1067            MOV     @R1,A
064E 18      1068            INC     R0
064F 19      1069            INC     R1
0650 F0      1070            MOV     A,@R0
0651 A1      1071            MOV     @R1,A
0652 FC      1072 STTB1:     MOV     A,R4
0653 E7      1073            RL      A
0654 E7      1074            RL      A
0655 E7      1075            RL      A               ;PREVIOUS STATE * 8
0656 B974    1076            MOV     R1,#PRESST
0658 61      1077            ADD     A,@R1           ;NEW STATE LOCATION =
             1078                                    ;(PREV STATE*8 + STATUS
             1079 ;
0659 E3      1079            MOVP3   A,@A
065A AB      1080            MOV     R3,A
```

```
065B B872     1081          MOV    R0,#FSTATE
065D 03A6     1082          ADD    A,#-90
065F CE6D     1083          JZ     ST90
0661 07       1084          DEC    A
0662 CE71     1085          JZ     ST91
0664 07       1086          DEC    A
0665 CE79     1087          JZ     ST92
0667 07       1088          DEC    A
0668 CE7D     1089          JZ     ST93
066A FB       1090          MOV    A,R3
066B A0       1091          MOV    @R0,A              ;STORE NEW STATUS
066C 83       1092 STTBL1:  RET
              1093
              1094 ST90:
066D B001     1095          MOV    @R0,#1             ;NEW STATE = 1
066F C481     1096          JMP    ACCID              ;ACCEPT ID
              1097
              1098 ST91:
0671 B002     1099          MOV    @R0,#2             ;NEW STATE = 2
0673 B87E     1100          MOV    R0,#IDFLG
0675 B000     1101          MOV    @R0,#0
0677 C481     1102          JMP    ACCID              ;ACCEPT ID
              1103
              1104 ST92:
0679 B003     1105          MOV    @R0,#3             ;STATE = 3
067B C481     1106          JMP    ACCID
              1107
              1108 ST93:
067D B001     1109          MOV    @R0,#1
067F C4AD     1110          JMP    NULCOW
              1111
              1112 ACCID:
0681 B87E     1113          MOV    R0,#IDFLG
0683 B000     1114          MOV    @R0,#0
              1115 ACPTID:
0685 B848     1116          MOV    R0,#OLDDAT
0687 F0       1117 ACPTD1:  MOV    A,@R0
0688 AB       1118          MOV    R3,A               ;TRANS # LSB
0689 B000     1119          MOV    @R0,#0
068B 18       1120          INC    R0
068C F0       1121          MOV    A,@R0
068D AC       1122          MOV    R4,A               ;TRANS # MSB
068E B000     1123          MOV    @R0,#0
0690 D41D     1124          CALL   PUSH               ;OUTPUT TRANSP NUMBER
0692 83       1125          RET                       ;TO PARLOR CONTROLLER
              1126
              1127 ACPNEW:
0693 B841     1128          MOV    R0,#BCDFTR         ;SENSING FAILURE
0695 F0       1129          MOV    A,@R0              ;SO ACCEPT I.D.
0696 AB       1130          MOV    R3,A
0697 18       1131          INC    R0
0698 F0       1132          MOV    A,@R0
0699 AC       1133          MOV    R4,A
069A D41D     1134          CALL   PUSH
069C 83       1135          RET
              1136
              1137 REMCOW:
069D B848     1138          MOV    R0,#OLDDAT
069F B0AA     1139          MOV    @R0,#0AAH
06A1 18       1140          INC    R0
06A2 B0AA     1141          MOV    @R0,#0AAH
06A4 B84E     1142          MOV    R0,#NEWDAT
06A6 B000     1143          MOV    @R0,#0
06A8 18       1144          INC    R0
06A9 B000     1145          MOV    @R0,#0
06AB C481     1146          JMP    ACCID
              1147
              1148
              1149 NULCOW:
06AD B87E     1150          MOV    R0,#IDFLG
06AF F0       1151          MOV    A,@R0
06B0 96B9     1152          JNZ    NULCW1
06B2 B848     1153          MOV    R0,#OLDDAT         ;COW WITHOUT TRANSPONDER
```

```
06B4 B000       1154            MOV     @R0,#0
06B6 18         1155            INC     R0
06B7 B000       1156            MOV     @R0,#0
06B9 C481       1157 NULCW1:    JMP     ACCID       ;SEND COW NUMBER 0
                1158                                ;FOR BLANK DISPLAY
                1159 ACPSEN:
06BB 83         1160            RET
                1161
                1162 ;------------------------------------------------
                1163 ;              STATE TABLE
                1164 ; AS DEFINED IN STATE FLOW-CHART
                1165 ;------------------------------------------------
                1166
0300            1167            ORG     0300H
                1168
0300 01         1169            DB      1           ;PREVIOUS STATE = 0
0301 01         1170            DB      1
0302 01         1171            DB      1
0303 01         1172            DB      1
0304 01         1173            DB      1
0305 01         1174            DB      1
0306 01         1175            DB      1
0307 01         1176            DB      1
                1177
0308 01         1178            DB      1           ;PREV. STATE = 1
0309 02         1179            DB      2
030A 03         1180            DB      3
030B 01         1181            DB      1
030C 04         1182            DB      4
030D 01         1183            DB      1
030E 01         1184            DB      1
030F 01         1185            DB      1
                1186
0310 01         1187            DB      1           ;PREV. STATE = 2
0311 02         1188            DB      2
0312 01         1189            DB      1
0313 05         1190            DB      5
0314 01         1191            DB      1
0315 06         1192            DB      6
0316 01         1193            DB      1
0317 01         1194            DB      1
                1195
0318 01         1196            DB      1           ;PREV. STATE = 3
0319 01         1197            DB      1
031A 03         1198            DB      3
031B 05         1199            DB      5
031C 01         1200            DB      1
031D 01         1201            DB      1
031E 07         1202            DB      7
031F 01         1203            DB      1
                1204
0320 01         1205            DB      1           ;PREV. STATE = 4
0321 01         1206            DB      1
0322 01         1207            DB      1
0323 01         1208            DB      1
0324 04         1209            DB      4
0325 06         1210            DB      6
0326 0C         1211            DB      12
0327 01         1212            DB      1
                1213
0328 01         1214            DB      1           ;PREV. STATE = 5
0329 02         1215            DB      2
032A 17         1216            DB      23
032B 05         1217            DB      5
032C 01         1218            DB      1
032D 01         1219            DB      1
032E 01         1220            DB      1
032F 08         1221            DB      8
                1222
0330 01         1223            DB      1           ;PREV. STATE = 6
```

```
0331 02    1224    DB    2
0332 01    1225    DB    1
0333 01    1226    DB    1
0334 04    1227    DB    4
0335 06    1228    DB    6
0336 01    1229    DB    1
0337 08    1230    DB    8
           1231
0338 01    1232    DB    1              ;PREV. STATE = 7
0339 01    1233    DB    1
033A 03    1234    DB    3
033B 01    1235    DB    1
033C 0F    1236    DB    15
033D 01    1237    DB    1
033E 07    1238    DB    7
033F 08    1239    DB    8
           1240
0340 01    1241    DB    1              ;PREV. STATE = 8
0341 01    1242    DB    1
0342 01    1243    DB    1
0343 05    1244    DB    5
0344 01    1245    DB    1
0345 06    1246    DB    6
0346 09    1247    DB    9
0347 08    1248    DB    8
           1249
0348 01    1250    DB    1              ;PREV. STATE = 9
0349 01    1251    DB    1
034A 5C    1252    DB    92
034B 01    1253    DB    1
034C 11    1254    DB    17
034D 01    1255    DB    1
034E 09    1256    DB    9
034F 08    1257    DB    8
           1258
0350 01    1259    DB    1              ;PREV. STATE = 10
0351 01    1260    DB    1
0352 01    1261    DB    1
0353 01    1262    DB    1
0354 01    1263    DB    1
0355 01    1264    DB    1
0356 01    1265    DB    1
0357 01    1266    DB    1
           1267
0358 01    1268    DB    1              ;PREV. STATE = 11
0359 01    1269    DB    1
035A 01    1270    DB    1
035B 01    1271    DB    1
035C 01    1272    DB    1
035D 01    1273    DB    1
035E 01    1274    DB    1
035F 01    1275    DB    1
           1276
0360 01    1277    DB    1              ;PREV. STATE = 12
0361 01    1278    DB    1
0362 1E    1279    DB    30
0363 01    1280    DB    1
0364 04    1281    DB    4
0365 01    1282    DB    1
0366 0C    1283    DB    12
0367 19    1284    DB    25
           1285
0368 01    1286    DB    1              ;PREV. STATE = 13
0369 01    1287    DB    1
036A 01    1288    DB    1
036B 01    1289    DB    1
036C 01    1290    DB    1
036D 01    1291    DB    1
036E 01    1292    DB    1
036F 01    1293    DB    1
           1294
```

```
0370 01     1295    DB      1       ;PREV. STATE = 14
0371 01     1296    DB      1
0372 01     1297    DB      1
0373 01     1298    DB      1
0374 01     1299    DB      1
0375 01     1300    DB      1
0376 01     1301    DB      1
0377 01     1302    DB      1
            1303
0378 5D     1304    DB      93      ;PREV. STATE = 15
0379 01     1305    DB      1
037A 01     1306    DB      1
037B 01     1307    DB      1
037C 0F     1308    DB      15
037D 06     1309    DB      6
037E 07     1310    DB      7
037F 01     1311    DB      1
            1312
0380 01     1313    DB      1       ;PREV. STATE = 16
0381 01     1314    DB      1
0382 01     1315    DB      1
0383 01     1316    DB      1
0384 01     1317    DB      1
LOC  OBJ    LINE    SOURCE STATEMENT 0385 01     1318    DB      1
0386 01     1319    DB      1
0387 01     1320    DB      1
            1321
0388 5A     1322    DB      90      ;PREV. STATE = 17
0389 01     1323    DB      1
038A 01     1324    DB      1
038B 01     1325    DB      1
038C 11     1326    DB      17
038D 06     1327    DB      6
038E 09     1328    DB      9
038F 01     1329    DB      1
            1330
0390 01     1331    DB      1       ;PREV. STATE = 18
0391 01     1332    DB      1
0392 01     1333    DB      1
0393 01     1334    DB      1
0394 01     1335    DB      1
0395 01     1336    DB      1
0396 01     1337    DB      1
0397 01     1338    DB      1
            1339
0398 01     1340    DB      1       ;PREV. STATE = 19
0399 01     1341    DB      1
039A 01     1342    DB      1
039B 01     1343    DB      1
039C 01     1344    DB      1
039D 01     1345    DB      1
039E 01     1346    DB      1
039F 01     1347    DB      1
            1348
03A0 01     1349    DB      1       ;PREV. STATE = 20
03A1 01     1350    DB      1
03A2 01     1351    DB      1
03A3 01     1352    DB      1
03A4 01     1353    DB      1
03A5 01     1354    DB      1
03A6 01     1355    DB      1
03A7 01     1356    DB      1
            1357
03A8 01     1358    DB      1       ;PREV. STATE = 21
03A9 01     1359    DB      1
03AA 01     1360    DB      1
03AB 01     1361    DB      1
03AC 01     1362    DB      1
03AD 01     1363    DB      1
03AE 01     1364    DB      1
```

```
LOC  OBJ      LINE      SOURCE STATEMENT

03AF 01       1365      DB    1
              1366
03B0 01       1367      DB    1           ;PREV. STATE = 22
03B1 01       1368      DB    1
03B2 01       1369      DB    1
03B3 01       1370      DB    1
03B4 01       1371      DB    1
03B5 01       1372      DB    1
03B6 01       1373      DB    1
03B7 01       1374      DB    1
              1375
03B8 01       1376      DB    1           ;PREV. STATE = 23
03B9 01       1377      DB    1
03BA 17       1378      DB    23
03BB 05       1379      DB    5
03BC 01       1380      DB    1
03BD 01       1381      DB    1
03BE 09       1382      DB    9
03BF 01       1383      DB    1
              1384
03C0 01       1385      DB    1           ;PREV. STATE = 24
03C1 01       1386      DB    1
03C2 01       1387      DB    1
03C3 01       1388      DB    1
03C4 01       1389      DB    1
03C5 01       1390      DB    1
03C6 01       1391      DB    1
03C7 01       1392      DB    1
              1393
03C8 01       1394      DB    1           ;PREV. STATE = 25
03C9 01       1395      DB    1
03CA 01       1396      DB    1
03CB 1A       1397      DB    26
03CC 01       1398      DB    1
03CD 0E       1399      DB    E
03CE 0C       1400      DB    12
03CF 19       1401      DB    25
              1402
03D0 01       1403      DB    1           ;PREV. STATE = 26
03D1 01       1404      DB    1
03D2 03       1405      DB    3
03D3 1A       1406      DB    26
03D4 01       1407      DB    1
03D5 01       1408      DB    1
03D6 01       1409      DB    1
03D7 19       1410      DB    25
              1411

LOC  OBJ      LINE      SOURCE STATEMENT

03D8 01       1412      DB    1           ;PREV. STATE = 27
03D9 01       1413      DB    1
03DA 01       1414      DB    1
03DB 01       1415      DB    1
03DC 01       1416      DB    1
03DD 01       1417      DB    1
03DE 01       1418      DB    1
03DF 01       1419      DB    1
              1420
03E0 01       1421      DB    1           ;PREV. STATE = 28
03E1 01       1422      DB    1
03E2 01       1423      DB    1
03E3 01       1424      DB    1
03E4 01       1425      DB    1
03E5 01       1426      DB    1
03E6 01       1427      DB    1
03E7 01       1428      DB    1
              1429
03E8 01       1430      DB    1           ;PREV. STATE = 29
03E9 01       1431      DB    1
03EA 01       1432      DB    1
03EB 01       1433      DB    1
03EC 01       1434      DB    1
```

```
03ED 01      1435          DB    1
03EE 01      1436          DB    1
03EF 01      1437          DB    1
             1438
03F0 01      1439          DB    1            ;PREV. STATE = 30
03F1 01      1440          DB    1
03F2 1E      1441          DB    30
03F3 03      1442          DB    3
03F4 01      1443          DB    1
03F5 01      1444          DB    1
03F6 0C      1445          DB    12
03F7 01      1446          DB    1
             1447
03F8 01      1448          DB    1            ;PREV. STATE = 31
03F9 01      1449          DB    1
03FA 01      1450          DB    1
03FB 01      1451          DB    1
03FC 01      1452          DB    1
03FD 01      1453          DB    1
03FE 01      1454          DB    1
03FF 01      1455          DB    1
             1456
             1457
             1458  ;----------------------------------------
             1459  ;     DSPLAY--DISPLAY MANAGER ROUTINE
             1460  ;----------------------------------------
             1461  ;
             1462  ;
0700         1463          ORG   0700H
             1464
             1465  DSPLAY:
0700 8A07    1466          ORL   P2,#DSEL
0702 BA02    1467          MOV   R2,#02
0704 B93E    1468          MOV   R1,#DSBUF
0706 F0      1469  DSPL1:  MOV   A,@R0
0707 530F    1470          ANL   A,#0FH
0709 03E0    1471          ADD   A,#0E0H
070B A3      1472          MOVP  A,@A
070C A1      1473          MOV   @R1,A
070D 19      1474          INC   R1
070E F0      1475          MOV   A,@R0
070F 53F0    1476          ANL   A,#0F0H
0711 47      1477          SWAP  A
0712 03E0    1478          ADD   A,#0E0H
0714 A3      1479          MOVP  A,@A
0715 A1      1480          MOV   @R1,A
0716 18      1481          INC   R0
0717 19      1482          INC   R1
0718 EA06    1483          DJNZ  R2,DSPL1
071A 546E    1484          CALL  BNKTST       ;TEST FOR LEADING ZEROS
071C BE3E    1485  DSWR2:  MOV   R0,#DSBUF
071E F0      1486          MOV   A,@R0
071F BA05    1487          MOV   R2,#05
0721 9AFD    1488          ANL   P2,#KEYCA
0723 2390    1489          MOV   A,#DSCMD
0725 90      1490          MOVX  @R0,A
0726 9AFC    1491          ANL   P2,#KEYDF
0728 F0      1492  DSWR1:  MOV   A,@R0
0729 90      1493          MOVX  @R0,A
072A 18      1494          INC   R0
072B EA28    1495          DJNZ  R2,DSWR1
072D 8A07    1496          ORL   P2,#DSEL
072F 83      1497          RET
             1498
             1499  ;----------------------------------------
             1500  ;     XMIT--TRANSMIT ROUTINE
             1501  ;----------------------------------------
             1502  XMIT:
0730 C8      1503          DEC   R0
0731 1E      1504  TRAN1:  INC   R0
0732 8A07    1505          ORL   P2,#DSEL
```

```
LOC   OBJ         LINE        SOURCE STATEMENT 0734  9AFB        1506              ANL     P2,#UARTCA
0736  81          1507  TRAN2:      MOVX    A,@R1           ;READ STATUS
0737  37          1508              CPL     A
0738  1236        1509              JB0     TRAN2           ;OUTPUT READY?
073A  2311        1510              MOV     A,#11H          ;DISABLE RECEIVER
073C  91          1511              MOVX    @R1,A
073D  81          1512  TRAN4:      MOVX    A,@R1
073E  37          1513              CPL     A
073F  123D        1514              JB0     TRAN4
0741  9AFA        1515              ANL     P2,#UARTDA
0743  F0          1516              MOV     A,@R0
0744  91          1517              MOVX    @R1,A           ;WRITE BYTE TO UART
0745  81          1518              MOVX    A,@R1           ;RD DATA(= ZERO RXREADY)
0746  EA31        1519              DJNZ    R2,TRAN1        ;NEXT BYTE
0748  8A01        1520              ORL     P2,#01          ;WAIT FOR TX RDY
074A  81          1521  TRAN3:      MOVX    A,@R1           ;WAIT FOR TX EMPTY
074B  37          1522              CPL     A
074C  524A        1523              JB2     TRAN3
074E  2315        1524              MOV     A,#15H
0750  91          1525              MOVX    @R1,A           ;ENABLE RECEIVER
0751  8A07        1526              ORL     P2,#DSEL
0753  83          1527              RET
                  1528  ;
                  1529  REPEAT:
0754  B822        1530              MOV     R0,#OUTBUF
0756  BA0E        1531              MOV     R2,#0EH
0758  F430        1532              CALL    XMIT
075A  B934        1533              MOV     R1,#INPTR
075C  B100        1534              MOV     @R1,#00H
075E  83          1535              RET
                  1536  ;
                  1537  ;---------------------------------------------------------
                  1538  ;           RECEPTION ACKNOWLEDGE ROUTINE
                  1539  ;---------------------------------------------------------
                  1540  ;
                  1541  ACKN:
075F  B920        1542              MOV     R1,#IDADD
0761  F1          1543              MOV     A,@R1
0762  A0          1544              MOV     @R0,A           ;LOAD ADDRESS
0763  BA02        1545              MOV     R2,#02          ;TRANS ACKN
0765  E430        1546              JMP     XMIT
                  1547
                  1548  ;---------------------------------------------------------
                  1549  ;                    DISPLAY TABLE
                  1550  ;---------------------------------------------------------
                  1551  ;
07E0              1552              ORG     07E0H           ;START OF TABLE
07E0  3F          1553              DB      3FH             ;"0"
07E1  06          1554              DB      06H             ;"1"
07E2  5B          1555              DB      5BH             ;"2"
07E3  4F          1556              DB      4FH             ;"3"
07E4  66          1557              DB      66H             ;"4"
07E5  6D          1558              DB      6DH             ;"5"
07E6  7C          1559              DB      7CH             ;"6"
07E7  07          1560              DB      07H             ;"7"
07E8  7F          1561              DB      7FH             ;"8"
07E9  6F          1562              DB      6FH             ;"9"
07EA  00          1563              DB      00H             ;"BLANK"
07EB  40          1564              DB      40H             ;"-"
07EC  61          1565              DB      61H             ;"C"
07ED  79          1566              DB      79H             ;"E"
07EE  50          1567              DB      50H             ;"r"
07EF  71          1568              DB      71H             ;"F"
                  1569  ;
                  1570              END

USER SYMBOLS
ACID    0681    ACKN    075F    ACPNEW  0693    ACPSEN  06BB    ACPTD1  0687
APTID   0685    ADDSET  00F1    BCDPTR  0041    BCNT    0021    BCOUNT  FFD3
```

| | | | | | | | |
|---|---|---|---|---|---|---|---|
| IN1 | 0285 | BINBCD | 027D | BINPTR | 0043 | BKDIS2 | 050B |
| BKTST1 | 0272 | KTST2 | 027C | BLCNT | 006E | BLKDIS | 0500 |
| BNKTST | 026E | BUSFRE | 026D | AL_ | 00E5 | CLKTIM | 003B |
| CLOSED | 0000 | CLRDAT | 001C | CNT1 | FFFD | NT2 | FFD3 |
| COUNT | 00A5 | COUNT1 | 00FA | COUNT2 | 0078 | DAT1 | 047E |
| AT2 | 0485 | DAT2A | 0489 | DAT3 | 048F | DAT4 | 0499 |
| DAT5 | 04A1 | ATE | 04A5 | DATCON | 0600 | DATLOW | 003F |
| DATOUT | 047E | DCOUNT | FFFE | ECO0 | 0424 | DECO1 | 0402 |
| DECO2 | 044A | DECO2B | 044C | DECO4 | 045E | ECO5 | 045D |
| DECODE | 0400 | DELAY | 02B7 | DETCT1 | 0516 | DETECT | 050E |
| FLAG | 0070 | DSBUF | 002E | DSCMD | 0090 | DSEL | 0007 |
| DSPL1 | 070E | SPLAY | 0700 | DSTAT | 0071 | DSWR1 | 0728 |
| DSWR2 | 071C | DTIME | 0077 | VALID | 004B | EXTINT | 00FD |
| FAILB | 0073 | FORE | 008A | FORE0 | 0094 | ORE0A | 00AE |
| FORE1 | 00BA | FORE2 | 00BC | FORE3 | 00CE | FOREA | 00AC |
| OREB | 00AE | GDLY | FFC4 | GLIGHT | 002C | GTEST | 04B9 |
| GTEST1 | 04D4 | TEST2 | 04DD | HFBIT | 004C | IDADD | 0020 |
| IDBUF | 004D | IDCLR | 0052 | DCNTL | 004A | IDFLG | 007E |
| IDLEC2 | 007D | IDLECT | 007C | IDQUE | 006D | DTIME | FF83 |
| IDTS2 | 05AA | IDTST | 0593 | INBUF | 0035 | INIT51 | 0020 |
| NIT79 | 0034 | INPTR | 0034 | INTS1 | 01B3 | INTS2 | 01C8 |
| INTST | 01AF | EYBLK | 00D0 | KEYCA | 00FD | KEYCMD | 0000 |
| KEYDA | 00FC | KEYPSC | 0020 | PBLK | 050E | NEWDAT | 0046 |
| NOPRS1 | 053D | NOPRS2 | 0574 | NULCOW | 06AD | ULCW1 | 06B9 |
| OFCNT | FFFE | OFDLY1 | 007A | OFDLY2 | 007B | OFF | 0000 |
| LDBUF | 0028 | OLDDAT | 0048 | ON | 00FF | ONCNT | FFFE |
| ONDLY1 | 0078 | NDLY2 | 0079 | OPEN | 00FF | OUTBUF | 0022 |
| OUTS1 | 04B0 | OUTS2 | 04B4 | UTS3 | 04B8 | OUTST | 04AE |
| PARITY | 0045 | POP | 029B | POP1 | 02A1 | OP2 | 02B5 |
| PREAMB | 003E | PRESST | 0074 | PSTATE | 027E | PUSH | 0E1D |
| USH1 | 0E31 | PWRLIT | 0040 | RAMT | 007F | RDBIT | 024A |
| RDBIT1 | 0255 | JHB1 | 02EA | RDHBIT | 025D | RDWD1 | 021D |
| RDWD2 | 0227 | RDWD3 | 022C | JWD4 | 0247 | RDWORD | 0200 |
| REGB0 | 0000 | REGB1 | 0018 | REMCOW | 0E9D | EPEAT | 0754 |
| RIGHTU | 00F9 | RSEN2 | 0551 | RSTAT | 02C2 | SSTAT | 02CA |
| T90 | 066D | ST91 | 0671 | ET92 | 0679 | ET93 | 067D |
| STACK | 0006 | IART | 0009 | STATUS | 006F | STEST | 02D2 |
| STEST1 | 02ED | STEST2 | 02F1 | TRT1 | 0016 | STTB0 | 0643 |
| STTB1 | 0652 | STTBL | 0632 | STTBL1 | 066C | EST1 | 05B8 |
| TIM2A | 0126 | TIM2B | 0130 | TIM2C | 0128 | TIM2A | 0175 |
| IME6 | 017A | TIM6BA | 0191 | TIM6C | 0193 | TIM6D | 019D |
| TIM6H | 00F5 | IMEL | 0042 | TIMIN1 | 011C | TIMIN2 | 0124 |
| TIMIN3 | 0145 | TIMIN4 | 015B | IMIN7 | 01AD | TIMIN6 | 01AD |
| TIMINT | 0100 | TNOFF | 0462 | TRAN1 | 0731 | RAN2 | 073E |
| TRAN3 | 074A | TRAN4 | 073D | TRCNT | FFFE | TRCNTR | 0075 |
| JRNON | 045E | UARTCA | 00FB | UARTCM | 0015 | UARTDA | 00FA |
| UARTL | 003C | ARTMD | 009A | XFER | 0467 | XFER1 | 046D |
| XMIT | 0730 | | | | | | |

ASSEMBLY COMPLETE, NO ERRORS

We claim:

1. An electronic identification system for identifying an object moving through a portal structure comprising:
    at least one generating means for generating a multi-directional electromagnetic field in a plurality of different angular relations to the direction of movement of the object through the portal structure;
    at least one first receiving means for attachment to the object for receiving and storing energy from the electromagnetic field;
    at least one transmission means for attachment to the object for transmitting identifying data after the at least one first receiving means has received energy from the electromagnetic field;
    at least one second receiving means for receiving the identifying data from the object; and
    a flexible curtain secured to the portal structure, wherein the at least one generating means and the at least one second receiving means comprise an antenna loop secured to the flexible curtain.

2. The system of claim 1 comprising separate detector means for detecting the presence of the object within the portal structure.

3. The system of claim 2 wherein the separate detector means comprises an ultra-sonic transducer at the entrance to the portal structure and an ultra-sonic transducer at the exit to the portal structure whereby the separate detector means can determine the direction of movement of the object through the portal structure.

4. The system of claim 2 and including a microprocessor for controlling the at least one generating means, the at least one first receiving means, the at least one transmission means, the at least one second receiving means and the separate detector means.

5. The system of claim 1 wherein the curtain has pocket flaps and comprising stiffener plates located in said flaps for strengthening the curtain and for maintaining the proper angular orientation of the antenna loop.

6. The system of claim 1 further for identifying a plurality of objects, wherein individual objects move through one of a plurality of portal structures, the system comprising:
    a plurality of generating means;
    a plurality of first receiving means, each for attachment to individual objects;

a plurality of transmission means, each for attachment to individual objects;

a plurality of second receiving means; and a plurality of flexible curtains, each of the flexible curtains being secured to individual portal structures, and each of the generating means and the second receiving means comprising an antenna loop secured to individual flexible curtains.

7. The system of claim 6 also comprising microprocessor control means for controlling the plurality of generating means, the plurality of first receiving means and the plurality of second receiving means, wherein the microprocessor control means determines whether individual generating means and individual second receiving means are activated at a given point in time.

8. An electronic identification system for identifying an animal moving through a portal structure comprising:

a parallel resonant circuit connected to the portal structure including a double antenna loop for alternately generating a multi-directional electromagnetic field in a plurality of different angular relations to the direction of movement of the object through the portal structure and receiving identifying data concerning the animal;

a flexible curtain attached to the portal structure, said loop being located in said curtain;

a transponder adapted to be worn by the animal for receiving energy from the electromagnetic field and, when the electromagnetic field is removed, for transmitting the identifying data to the first parallel resonant circuit; and separate detector means for detecting the presence and direction of movement of the animal as the animal moves through the portal structure.

9. The system of claim 8 wherein the curtain has pocket flaps and comprising stiffener plates located in said flaps for strengthening the curtain.

10. The system of claim 8 wherein the separate detector means comprises at least one ultra-sonic transducer.

* * * * *